United States Patent
Naidoo et al.

(10) Patent No.: US 7,015,806 B2
(45) Date of Patent: *Mar. 21, 2006

(54) DISTRIBUTED MONITORING FOR A VIDEO SECURITY SYSTEM

(75) Inventors: Surendra N. Naidoo, Austin, TX (US); William P. Glasgow, Austin, TX (US); Gregory E. Feldkamp, Southlake, TX (US)

(73) Assignee: @Security Broadband Corporation, Austin, TX (US)

( * ) Notice: Subject to any disclaimer, the term of this patent is extended or adjusted under 35 U.S.C. 154(b) by 457 days.

This patent is subject to a terminal disclaimer.

(21) Appl. No.: 09/969,521

(22) Filed: Oct. 2, 2001

(65) Prior Publication Data

US 2003/0062997 A1  Apr. 3, 2003

Related U.S. Application Data

(63) Continuation-in-part of application No. 09/954,976, filed on Sep. 18, 2001, which is a continuation-in-part of application No. 09/357,196, filed on Jul. 20, 1999, now Pat. No. 6,690,411.

(51) Int. Cl.
*G08B 1/00* (2006.01)

(52) U.S. Cl. ............... 340/531; 340/506; 340/541; 348/143

(58) Field of Classification Search ............. 340/541, 340/539.1, 539.16, 539.17, 539.22, 539.25, 340/531, 506; 348/143, 152, 153, 154, 155, 348/159; 379/37, 39, 40, 42, 44
See application file for complete search history.

(56) References Cited

U.S. PATENT DOCUMENTS

| 4,591,834 | A | 5/1986 | Kyle ........................... 340/566 |
| 4,918,717 | A | 4/1990 | Bissonnette et al. .......... 379/40 |
| 5,164,703 | A | 11/1992 | Rickman ..................... 340/515 |
| 5,164,979 | A | 11/1992 | Choi ............................ 379/40 |
| 5,283,816 | A | 2/1994 | Gomez Diaz ................ 379/40 |
| 5,400,011 | A | 3/1995 | Sutton ......................... 340/566 |
| 5,406,260 | A | 4/1995 | Cummings et al. ......... 340/568 |
| 5,414,409 | A | 5/1995 | Voosen et al. .............. 340/541 |

(Continued)

FOREIGN PATENT DOCUMENTS

BE       1008939       10/1996

(Continued)

OTHER PUBLICATIONS

GrayElectronics, http://www.grayelectronics.com/default/htm (Continued)

*Primary Examiner*—Thomas Mullen
(74) *Attorney, Agent, or Firm*—Conley Rose, P.C.

(57) ABSTRACT

A system and method for distributed monitoring and remote verification of conditions surrounding an alarm condition in a security system. A security gateway detects alarm conditions at a premises and records video relating to the alarm condition. The security gateway transmits an alarm notification and the video across a network to a security system server in substantially real time. The security system server relays information to one or more distributed monitoring clients using rules-based routines for verification of the alarm condition. An operator at a monitoring client determines whether the alarm condition represents an actual alarm event and activates an appropriate response.

23 Claims, 8 Drawing Sheets

U.S. PATENT DOCUMENTS

| | | | |
|---|---|---|---|
| 5,414,833 A | 5/1995 | Hershey et al. | 395/575 |
| 5,448,290 A | 9/1995 | VanZeeland | 348/153 |
| 5,452,344 A | 9/1995 | Larson | 379/107 |
| 5,510,975 A | 4/1996 | Ziegler, Jr. | 364/148 |
| 5,526,428 A | 6/1996 | Arnold | 380/25 |
| 5,534,845 A | 7/1996 | Issa et al. | 340/425.5 |
| 5,541,585 A | 7/1996 | Duhame et al. | 340/825.69 |
| 5,543,778 A | 8/1996 | Stouffer | 340/539 |
| 5,550,984 A | 8/1996 | Gelb | 395/200.17 |
| 5,557,254 A | 9/1996 | Johnson et al. | 340/426 |
| 5,570,079 A | 10/1996 | Dockery | 340/541 |
| 5,572,438 A | 11/1996 | Ehlers et al. | 364/492 |
| 5,602,918 A | 2/1997 | Chen et al. | 380/21 |
| 5,604,493 A | 2/1997 | Behlke | 341/22 |
| 5,606,615 A | 2/1997 | Lapointe et al. | 380/25 |
| 5,621,662 A | 4/1997 | Humphries et al. | 364/550 |
| 5,629,687 A | 5/1997 | Sutton et al. | 340/825.37 |
| 5,631,630 A | 5/1997 | McSweeney | 340/522 |
| 5,638,046 A | 6/1997 | Malinowski | 340/539 |
| 5,652,567 A | 7/1997 | Traxler | 340/552 |
| 5,675,321 A | 10/1997 | McBride | 340/568 |
| 5,680,131 A | 10/1997 | Utz | 341/176 |
| 5,682,133 A | 10/1997 | Johnson et al. | 340/426 |
| 5,686,885 A | 11/1997 | Bergman | 340/514 |
| 5,689,235 A | 11/1997 | Sugimoto et al. | 340/541 |
| 5,689,708 A | 11/1997 | Regnier et al. | 395/682 |
| 5,691,697 A | 11/1997 | Carvalho et al. | 340/544 |
| 5,694,595 A | 12/1997 | Jacobs et al. | 395/609 |
| 5,696,486 A | 12/1997 | Poliquin et al. | 340/506 |
| 5,696,898 A | 12/1997 | Baker et al. | 395/187.01 |
| 5,706,191 A | 1/1998 | Bassett et al. | 364/138 |
| 5,712,679 A | 1/1998 | Coles | 348/158 |
| 5,714,933 A | 2/1998 | Le Van Suu | 340/568 |
| 5,717,378 A | 2/1998 | Malvaso et al. | 340/506 |
| 5,719,551 A | 2/1998 | Flick | 340/426 |
| 5,726,912 A | 3/1998 | Krall, Jr. et al. | 702/186 |
| 5,736,927 A | 4/1998 | Stebbins et al. | 340/506 |
| 5,737,391 A | 4/1998 | Dame et al. | 379/37 |
| 5,748,084 A | 5/1998 | Isikoff | 340/568 |
| 5,748,089 A | 5/1998 | Sizemore | 340/574 |
| 5,757,616 A | 5/1998 | May et al. | 361/683 |
| 5,761,206 A | 6/1998 | Kackman | 370/476 |
| 5,774,051 A | 6/1998 | Kostusiak | 340/539.11 |
| 5,784,461 A | 7/1998 | Shaffer et al. | 705/51 |
| 5,784,463 A | 7/1998 | Chen et al. | 713/171 |
| 5,793,028 A | 8/1998 | Wagener et al. | 235/380 |
| 5,793,763 A | 8/1998 | Mayes et al. | 370/389 |
| 5,801,618 A | 9/1998 | Jenkins | 340/426 |
| 5,805,056 A | 9/1998 | Mueller et al. | 340/426.24 |
| 5,805,064 A | 9/1998 | Yorkey | 340/550 |
| 5,809,013 A | 9/1998 | Kackman | 370/253 |
| 5,812,054 A | 9/1998 | Cohen | 340/506 |
| 5,845,070 A | 12/1998 | Ikudome | 713/201 |
| 5,854,588 A | 12/1998 | Dockery | 340/541 |
| 5,859,966 A | 1/1999 | Hayman et al. | 713/200 |
| 5,861,804 A | 1/1999 | Fansa et al. | 340/539.22 |
| 5,867,484 A | 2/1999 | Shaunfield | 370/254 |
| 5,877,696 A | 3/1999 | Powell | 340/5.33 |
| 5,880,775 A | 3/1999 | Ross | 348/143 |
| 5,881,226 A | 3/1999 | Veneklase | 713/202 |
| 5,892,442 A | 4/1999 | Ozery | 340/539.14 |
| 5,898,831 A | 4/1999 | Hall et al. | 713/201 |
| 5,926,209 A | 7/1999 | Glatt | 348/143 |
| 6,002,430 A | 12/1999 | McCall et al. | 348/207 |
| 6,069,655 A | 5/2000 | Seeley et al. | 348/154 |
| 6,091,771 A | 7/2000 | Seeley et al. | 375/240 |
| 6,097,429 A | 8/2000 | Seeley et al. | 348/154 |
| 6,108,034 A | 8/2000 | Kim | 348/154 |
| 6,124,882 A | 9/2000 | Voois et al. | 348/15 |
| 6,226,031 B1 | 5/2001 | Barraclough et al. | 348/14.13 |
| 6,400,265 B1 * | 6/2002 | Saylor et al. | 340/539.25 |
| 6,504,479 B1 * | 1/2003 | Lemons et al. | 340/541 |
| 6,559,769 B1 * | 5/2003 | Anthony et al. | 340/541 |
| 6,741,171 B1 * | 5/2004 | Palka et al. | 340/501 |
| 2002/0005894 A1 * | 1/2002 | Foodman et al. | 348/143 |
| 2002/0118796 A1 * | 8/2002 | Menard et al. | 379/45 |
| 2003/0061615 A1 * | 3/2003 | Van Der Meulen | 725/74 |

FOREIGN PATENT DOCUMENTS

| | | |
|---|---|---|
| CA | 2203813 | 6/1996 |
| CA | 2174482 | 10/1997 |
| GB | 2286423 | 8/1995 |
| GB | 2291554 | 1/1996 |
| GB | 2320644 | 6/1998 |
| GB | 2325548 | 11/1998 |
| JP | 06/339183 | 12/1994 |
| TW | 340934 | 9/1998 |
| WO | 89/11187 | 11/1989 |
| WO | 95/13944 | 5/1995 |
| WO | 97/13230 | 4/1997 |
| WO | 98/25243 | 6/1998 |
| WO | 98/52343 | 11/1998 |
| WO | 98/59256 | 12/1998 |
| WO | 02/11444 | 2/2002 |

OTHER PUBLICATIONS visitalk.com—communication with vision, http://www.visitalk.com.
Genex OmniEye, http://www.genextech.com/prod01.htm.

* cited by examiner

DISTRIBUTED MONITORING FOR A VIDEO SECURITY SYSTEM

RELATED APPLICATIONS

The present application is a continuation-in-part of U.S. application Ser. No. 09/954,976, filed Sep. 18, 2001, titled "Video Security System". Separate from the foregoing, U.S. patent application No. 09/954,976 is a continuation-in-part of U.S. application Ser. No. 09/357,196, filed Jul. 20, 1999, now U.S. Pat. No. 6,690,411.

BACKGROUND OF THE INVENTION

1. Field of the Invention

The present invention relates generally to a security system. More specifically, this invention relates to a device and method for the remote verification and monitoring of conditions surrounding an alarm signal.

2. Description of Related Art

Inherent in security systems is the problem of false alarms. In situations where local authorities are notified of alarms, false alarms can result in the owner of the system being subject to significant fines. In addition, false alarms waste the limited resources available to the authorities to respond to legitimate alarm situations. It is therefore desirable that a security system permits verification of detected alarm conditions.

Conventional security systems typically protect a building using make/break contacts strategically placed at doors, windows, and other potential entry points. Sensors are installed on doors and/or windows. Motion sensors are installed in strategic areas inside the home. Other devices such as glass breakage detectors, panic or medical alert buttons, low temperature and flood sensors can be installed as well. When the system is on and a sensor is tripped, a signal is sent through a wire, or using radio frequencies (on wireless systems), to the main controller which sounds a siren and dials out via telephone or cellular service to the monitoring station whenever an alarm occurs.

When a contact is broken an alarm is sounded or relayed to a central control station located within the building, nearby to the building, or remotely to a central control station of the security company. Besides make/break sensors, security companies also use P.I.R. (passive infra red) sensors which sense heat differences caused by animate objects such as humans or animals. Also used are vibration sensors which, when placed upon a window for example, detect when the window is broken, and radio frequency (rf), radar, and microwave sensors, as well as laser sensing. As with the make/break sensors, when any one of the sensors indicates a detection, a system alarm is indicated. A trouble indication is also given if an alarm unit for the building to which the sensors are connected senses that a path to a sensor is interrupted or broken.

With many current alarm systems, all that the receiver of an alarm, whether at a local or remote central station, knows is that an alarm has occurred. However, the occurrence of an alarm provides no indication as to its cause. Thus, the operator has no other knowledge by which he can determine if an alarm signals the presence of a real intruder, or if it is a false alarm. Sensors may commonly go off during inclement weather (they are sensitive to large electromagnetic fields such as occurring during lightning conditions). Such an erroneous condition is properly referred to as a false alarm. Regardless of why they occur, all false and unwanted alarms detrimentally affect the efficiency and operation of a security system.

Many criteria determine whether or not an alarm condition exists. For example, when a person opens a door monitored by a sensor, a potential alarm condition is created. However, an alarm system typically has a keypad or other coded system control by which, if an appropriate entry is made within a prescribed period of time, signifies that the alarm condition is not to be acted upon. Rather, the entrant is someone authorized to enter the premises. Further, the class of intruder (e.g., human or animal) may be perfectly acceptable in one set of circumstances, but not so in another. The common situation is one where an intruder is a human, and his presence results in an alarm being given.

One technological approach to obtaining such verification is through the use of separate audio monitors operating in concert with separate alarm sensors. U.S. Pat. Nos. 4,591,834 and 4,918,717 are directed to such systems. For example, U.S. Pat. No. 4,591,834 refers to the use of miniature, low-frequency dynamic microphones. Alarm activities noted at the microphones are verified via a separate network of discriminator sensors which comprise geophones. Signal processing techniques are utilized to distinguish alarm activity. Intrusion and discriminator sensors are arranged in known patterns comprised of multiple sensors of each type. U.S. Pat. No. 4,918,717 refers to a system wherein a number of microphones are distributed about a secured premises in relation to other intrusion sensors. Upon detection of an intrusion alarm, the microphones can be manually enabled one at a time from the central station to allow an operator to listen to audio activity in proximity to the sensor alarm.

Another approach is the use of video images to monitor a location. However, in prior art devices these images have been low-resolution, freeze-frame pictures, making it difficult for a viewer to discern what is being shown. In addition, in many prior art devices, the video images may not be received by the monitoring party until several moments have passed after the recorded event has actually taken place likely causing any response to be late and less effective.

An additional problem with some existing security systems is that once a person has left the property, it is common for that person to worry that he or she has forgotten to activate or arm the security system. In addition, such persons may have the desire to monitor the property even in the absence of alarm conditions. Further, a person may have the desire to modify aspects of the security system while they are absent. In prior art systems, it has been necessary to telephone a neighbor to ask them to check on the property and report back to the person.

SUMMARY OF THE INVENTION

In one broad respect, the present invention describes a security system for providing security monitoring, comprising: a security gateway located at a designated premises, wherein the security gateway is operable to detect an alarm condition and to record video of at least a portion of the premises relating to the alarm condition, said video hereinafter referred to the Alarm Video; a security system server operatively coupled to the security gateway, wherein the security gateway is configured to transfer to the security system server a notification of the alarm condition and the corresponding Alarm Video to the security system server in substantially real time; a plurality of monitoring clients operatively coupled to the security system server; wherein the security system server is configured to transfer the notification of the alarm condition and the Alarm Video to one or more of the plurality of monitoring clients, referred to as designated monitoring clients, based upon a predefined set of one or more rules; and wherein said designated monitoring clients are configured to display at least a portion of the Alarm Video and the Associated User Data, and wherein said designated monitoring clients are configured to notify the security system server whether the notification of the alarm condition corresponds to an actual alarm condition. In a narrow respect, the set of rules comprises a geography-requirement that must be met by the designated monitoring clients. In another narrow respect, the set of rules comprises one or more minimum resource requirements that must be met by the designated monitoring clients. In a narrower respect, one or more minimum resource requirements comprises an availability requirement. In another narrower respect, the one or more minimum resource requirements comprises a network-efficiency requirement. In another narrow respect, at least one of the plurality of monitoring clients is designated as having a proficiency, and wherein said set of rules comprises a proficiency requirement that must be met by the designated monitoring clients. In another narrow respect, the set of rules comprises an availability requirement that must be met by the designated monitoring clients. In another narrow respect, at least one of the plurality of monitoring clients is operatively coupled to the security system server through the Internet. In another narrow respect, at least one of the plurality of monitoring clients is located at a location apart from the other of the plurality of monitoring clients.

In another broad respect, the present invention describes a method for providing monitoring in a security system comprising a security system server operatively coupled to a plurality of monitoring clients, wherein at least one of the plurality of monitoring clients is located at a location apart from the other of the plurality of monitoring clients, comprising the steps of: the security system server receiving notification of an alarm condition and video corresponding to the alarm condition, referred to as Alarm Video; the security system routing the notification of the alarm condition and the Alarm Video to one or more monitoring clients, referred to as designated monitoring clients, based upon a predefined set of rules; the designated monitoring clients displaying the notification of the alarm condition and Alarm Video; the respective operator at each of the designated monitoring clients determining whether the notification of the alarm condition corresponds to an actual alarm condition; and notifying the security system of the operator's determination. In a narrow respect, the set of rules comprises a geography-requirement that must be met by the designated monitoring clients. In another narrow respect, the set of rules comprises one or more minimum resource requirements that must be met by the designated monitoring clients. In a narrower respect, one or more minimum resource requirements comprises an availability requirement. In another narrower respect, one or more minimum resource requirements comprises a network-efficiency requirement. In another narrow respect, at least one of the plurality of monitoring clients is designated as having a proficiency, and wherein said set of rules comprises a proficiency requirement that must be met by the designated monitoring clients. In another narrow respect, the set of rules comprises a network-efficiency requirement that must be met by the designated monitoring clients.

In another broad respect, the present invention describes a security system for providing security monitoring, comprising: a plurality of security gateways, each located at a designated premises, wherein each security gateway is operable to detect an alarm condition and to record video of at least a portion of the respective premises relating to the alarm condition, said video hereinafter referred to the Alarm Video; a plurality of security systems servers, each security systems server operatively coupled to at least some of the plurality of security gateways such that each of the plurality of the security gateways is operatively coupled to at least one of the plurality of security systems servers, wherein each security gateway is configured to transfer to the one or more security system servers to which said security gateway is operably coupled, a notification of the alarm condition and the corresponding Alarm Video in substantially real time; a plurality of monitoring clients operatively coupled to the plurality of security system servers; wherein the security system servers are configured to transfer the received notification of the alarm condition and the Alarm Video to one or more of the plurality of monitoring clients, referred to as designated monitoring clients, based upon a predefined set of one or more rules; and wherein said designated monitoring clients are configured to display at least a portion of the Alarm Video and the Associated User Data, and wherein said designated monitoring clients are configured to notify the security system server whether the notification of the alarm condition corresponds to an actual alarm condition. In a narrow respect, at least one of the plurality of monitoring clients is operatively coupled to the security system server through the Internet. In another narrow respect, at least one of the plurality of monitoring clients is located at a location apart from the other of the plurality of monitoring clients.

BRIEF DESCRIPTION OF THE DRAWINGS

The following drawings form part of the present specification and are included to further demonstrate certain aspects of the present invention. The invention may be better understood by reference to one or more of these drawings in combination with the detailed description of specific embodiments presented herein.

It is to be noted, however, that the appended drawings illustrate only exemplary embodiments of the invention and are therefore not to be considered limiting of its scope, for the invention may admit to other equally effective embodiments. In addition, although the figures may depict embodiments wherein each of the components represent different devices or locations, they can be combined into a single device or location. In addition, a single component may be comprised of a combination of components.

DESCRIPTION OF ILLUSTRATIVE EMBODIMENTS

The present invention addresses several shortcomings of the prior art with a security system and framework that is configured to deliver real-time information, including video and/or about alarm conditions to monitoring personnel for them to verify alarm conditions and take appropriate follow up action. As a further advantage, the framework may be easily adapted for use in other applications that incorporate real-time information and video delivery.

The term "security system" is used broadly to mean a system for monitoring a premises, e.g. for the purpose of discouraging and responding to burglaries, fires, and other emergency situations. Such a security system is suited for residential homes, but may also find use with schools, nursing homes, hospitals, businesses or any other location in which real-time information may be useful in obtaining adequate response upon the occurrence of alarm conditions. By integrating broadband features, including audio and video capabilities, web access and wireless capabilities, embodiments of the present invention provide audio and video alarm verification, 24-hour monitoring capabilities and a secure web-site with remote access features and security-focused content. Embodiments of the present invention may also be used to reduce false alarms, improve police effectiveness, and generally increase its users'peace of mind while they are away from home.

Figure 1:
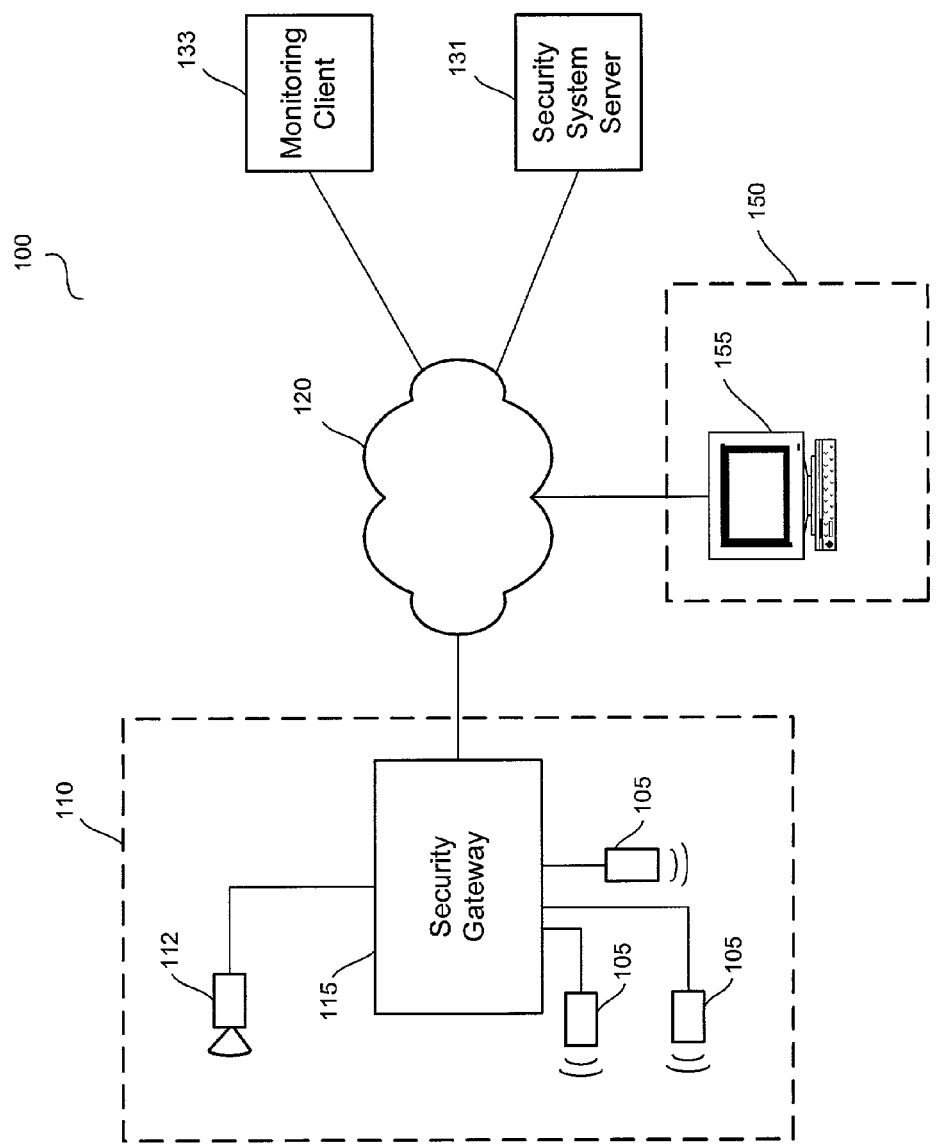
FIG. 1 is a simplified block diagram of a security system according to one embodiment of the disclosed system and method.

Referring to the drawings, FIG. 1 is a high-level block diagram of an exemplary security system according to one embodiment of the present invention. The security system 100 includes a security gateway 115 (also called a "base station"), which is typically located at the desired premises 110 to be monitored, and a monitoring client 133, typically located at a central station and operatively coupled to security gateway 115 through a network 120. Often, security gateway 115 is located at the target site. However, on some occasions, some or all components of security gateway 115 may be located remotely, but remain operatively coupled to security sensors 105 and video cameras 112 which are at the premises. Upon detection of an alarm condition, security gateway 115 captures video (usually through an attached video camera 112) of the target site, and sends the video to security system server 131 in real time.

For purposes of the present invention the term "premises" refers to any location to be monitored, whether residential, commercial, public, or secured. Further, the term "a" is generally used in the present disclosure to mean one or more. Still further, the terms "coupled" and "operatively coupled" mean connected in such a way that data may be exchanged. It is understood that "coupled" and "operatively coupled" do not require a direct connection, a wired connection, or even a permanent connection. It is sufficient for purposes of the present invention that the connection(s) be established for the sole purpose of exchanging information.

In general, network 120 may be a public network or private network, a single network or a combination of several networks. In most embodiments, network 120 may be, but is not required to be, an IP-based network. In some embodiments it may be desirable for all or a portion of network 120 to include publicly available networks, such as the Internet, to avoid the need for installing, purchasing, or leasing additional infrastructure. However, in some systems, e.g. those that use high-bandwidth transmissions, it may be desirable to include dedicated high-bandwidth connections including, without limitation, as leased lines, frame relay networks, and ATM networks, within network 120. Further, in some systems it may be desirable to use a network 120 with quality of service guarantees given the real-time nature of the information that is transmitted.

In the present disclosure, the term "high-speed" or "high-bandwidth" connections generally means those connections capable of providing enough bandwidth for data to be transmitted to the central station in real-time. In one embodiment, high-speed connections are those capable of transmitting at speeds of at least 128 KBPS. High-speed connections include but are not limited to cable modem connections, xDSL connections, and high-speed wireless connections.

Generally, security gateway 115 is a processor-based device that functions to detect alarm conditions at a target site, to capture information relating to such alarm conditions, and upon occasion of an alarm condition, to send such information ultimately to security system server 131 for verification and response. Monitoring client 133 is generally a software program that may be used to display some or all of the information provided by security gateway 115. Monitoring client 133 may be a stand-alone program or integrated into one or more existing software programs. One or more operators may then use this information to evaluate whether the alarm condition corresponds to an actual alarm condition and then take additional action, if desired, such as alerting the appropriate authorities. Advantageously, in many instances the incidence of false alarm being reported to the authorities is reduced, and the response effectiveness of the authorities is improved.

Security system 100 may include one or more sensors 105 coupled to security gateway 115 to detect alarm conditions. Security system 100 is not limited to any specific type or model of sensor 105. Any sensor 105 may be used, depending on the desired type and level of protection. Examples include, without limitation, magnetic contact switches, audio sensors, infrared sensors, motion detectors, fire alarms, and carbon monoxide sensors. Alarm sensors 105 may be wired directly into an alarm control panel built into security gateway 115 or they may be wirelessly connected. The type of sensor 105 to be used depends on the specific application for which security system 100 is designed. In some embodiments, multiple alarm sensors 105 may be used. In such multiple sensor embodiments, security gateway 115 may consider data from all, some, or one of sensors 105 in the detection of alarm conditions.

In addition, security system 100 includes one or more video cameras 112 that is operable to capture video of monitored premises 110. Camera 112 may be (but is not required to be) a 360-degree camera or a panoramic camera. In addition, security gateway 115 may be configured to create an association between one or more sensors and an associated video camera 112. Whether separate alarm sensors 105 are present or not, security gateway 115 may use video from video camera 112 to assist in the determination of whether an alarm condition exists and thereby whether to generate and send an alarm signal to the security system server 131. For example, in one embodiment, sensors 105 such as motion detectors, infra-red and audio sensors may be replaced by an intelligent alarm module that is able to detect motion or intrusion by analyzing the video image generated from camera 112. In another embodiment, security gateway 115 may analyze images from camera 112 and audio sound from an audio sensor 105 to detect an alarm condition. In some embodiments, the sensitivity of system 100 may be adjusted to account for the size and speed of intruders. For example, system 100 may be adjusted to trigger an alarm if a person walks across a monitored area but not a dog walking across the same area. Advantageously, a visual intelligent security system based on changes in the video image eliminates the need for many sometimes-expensive hardware sensors. Intelligent alarm applications typically require a significant amount of processing by security gateway 115, but may be easier to setup, maintain and upgrade since they are generally programmable. In one embodiment described below in greater detail, security gateway 115 may include a processor and memory to record and process video information for the intelligent alarm application.

The alarm video sent to the security system server 131 preferably begins at least just prior to the occurrence of the alarm condition and may end upon after the conclusion of the alarm condition, or alternatively, after a specified duration. Preferably, the segment shows enough of a time period to provide monitoring personnel with enough information to determine whether the alarm signal is a false alarm or not. In some embodiments, the segment of real-time video may be compressed using any compression techniques known by one of skill in the art. For example, this may involve the use of video compression algorithms such as "mpeg." Further, the resolution and/or color depth of the video may be reduced to decrease the required transmission bandwidth.

In one embodiment, alarm video is transmitted at least 3 frames per second. In addition, the alarm video may have an end resolution (i.e., after interpolation and/or image enhancement, etc.) of 320 pixels by 240 pixels or higher, and optionally may be transmitted in color. Further, said alarm video may but is not required to include a corresponding audio portion.

It is noted that the present invention is not limited to any particular audio, video, or communications standards. The present invention may incorporate any such standards, including, without limitation: H.323, ADPCM, H.263, MPEG, UDP, and TCP/IP.

In some embodiments, security gateway 115 may be installed similar to a conventional security system, e.g., mounted between studs in an unfinished area of the residence, for example a utility room. Preferably, cabling to security gateway 115 is restrained such that the cables cannot be pulled out of the unit, and security gateway 115 panel may be in a cabinet that can be locked to prevent unauthorized physical access.

In addition, because security gateway 115 is coupled to a network 120, it may be desirable to implement precautions to minimize risk from hackers, e.g., by minimizing the number of access points for hackers who might try to gain access to the unit. In addition, communication with security gateway 115 may be restricted and security gateway 115 may strictly control access, similar to a firewall with most ports blocked and having no external way to open them.

In addition, some embodiments of the present invention may include the functionality to allow access to security gateway 115 and security system server 131 using a remote station 155 operatively coupled to security gateway 115 and security system server 131. Remote user 155 must first be authenticated by security system server 131. It is noted that the present invention contemplates the use of any authentication techniques. Once authenticated, remote user may access some or all of the features of base station 115. These features may include, without limitation, arming or disarming the security system; adjusting sensitivities of sensors (if present); adjusting alarm condition detection sensitivity; remote surveillance; adjusting camera settings; and reviewing alarms and recordings. These functions may also include remote surveillance, referred to as "lifestyle video."

Remote user 155 may connect to security system server 131 and base station 115 (after authentication) through network 120. Because a remote user does not necessarily need real-time access to alarm video, a low-bandwidth connection may be used to connect remote station 155 to security system server 131 and base station 115. After authentication, security system server 131 may be configured to create a data connection between remote station 155 and security gateway 115 such that communications between remote station 155 and security gateway 115 bypass security system server 131. Advantageously, this avoids network bottlenecks at the security system server 131, particularly when transmitting large amounts of data such as during the transmission of streaming video.

In one embodiment, remote user 155, once authenticated, may perform remote surveillance through base station 115. The remote surveillance feature allows remote user 155 to view all or portions of the video signal from video camera 112. Depending on the bandwidth of the connection, the video may be of a lower quality than that transmitted to security system server 131 for verification of alarm signals. For example, in one embodiment, the video transmitted to remote user 155 may have a lower frame rate, lower resolution, and/or lower color depth. In addition, remote user 155 may be able to configure the quality of the video for remote monitoring. To address privacy concerns, an audio or visual indicator may be included to allow occupants at the premises to know that they are under remote surveillance.

In some embodiments, security gateway 115 may include a secondary alarm notification for transmitting alarm notifications to the security system server 131 through a secondary network. Such a system provides additional security in the event the primary system is damaged due to, for example, an accident, sabotage, or system failure. For example, the secondary network may include the public switched telephone network for transmitting alarm notification to security system server 131. Other examples of the secondary network include, without limitation, a fixed wireless network or mobile communications network.

In these embodiments, alarm notification may be sent at approximately the same time (or substantially simultaneously) through both network 120 and the secondary alarm notification network. Advantageously, this ensures that the security system server 131 is alerted of the alarm condition as early as possible.

In addition, security system server 131 may be operable to detect whether security gateway 115 is properly coupled to it. For example, in one embodiment, security system server 131 may "ping" security gateway 115 on a regular basis through network; if security system server 131 does not receive a response from security gateway 115, monitoring personnel at security system server 131 can take appropriate action. In this embodiment, it is preferable that security system server 131 may ping security gateway 115 with enough frequency such that appropriate action may be taken in a timely manner if security gateway 115 becomes uncoupled from security system server 131. More particularly, security system server 131 may be configured to ping security gateway 115 at least once every minute. Alternatively, the security gateway 115 may be configured to send a periodic heartbeat notification to the security system server 131. In these embodiments, the security system server 131 would expect to receive a heartbeat notification message once during each predefined interval. If a heartbeat message is not received, the security system server 131 would know that there may be a problem, and monitoring personnel may take the appropriate follow up action, such as contact the person responsible for the premises.

Additionally, security gateway 115 may be configured to detect if its network connectivity is lost, and send notification to the security system server 131 via the secondary backup. If network connectivity is lost while the system is disarmed, but the system is armed before network connectivity is restored, notification is again via the secondary alarm notification network.

Figure 2:
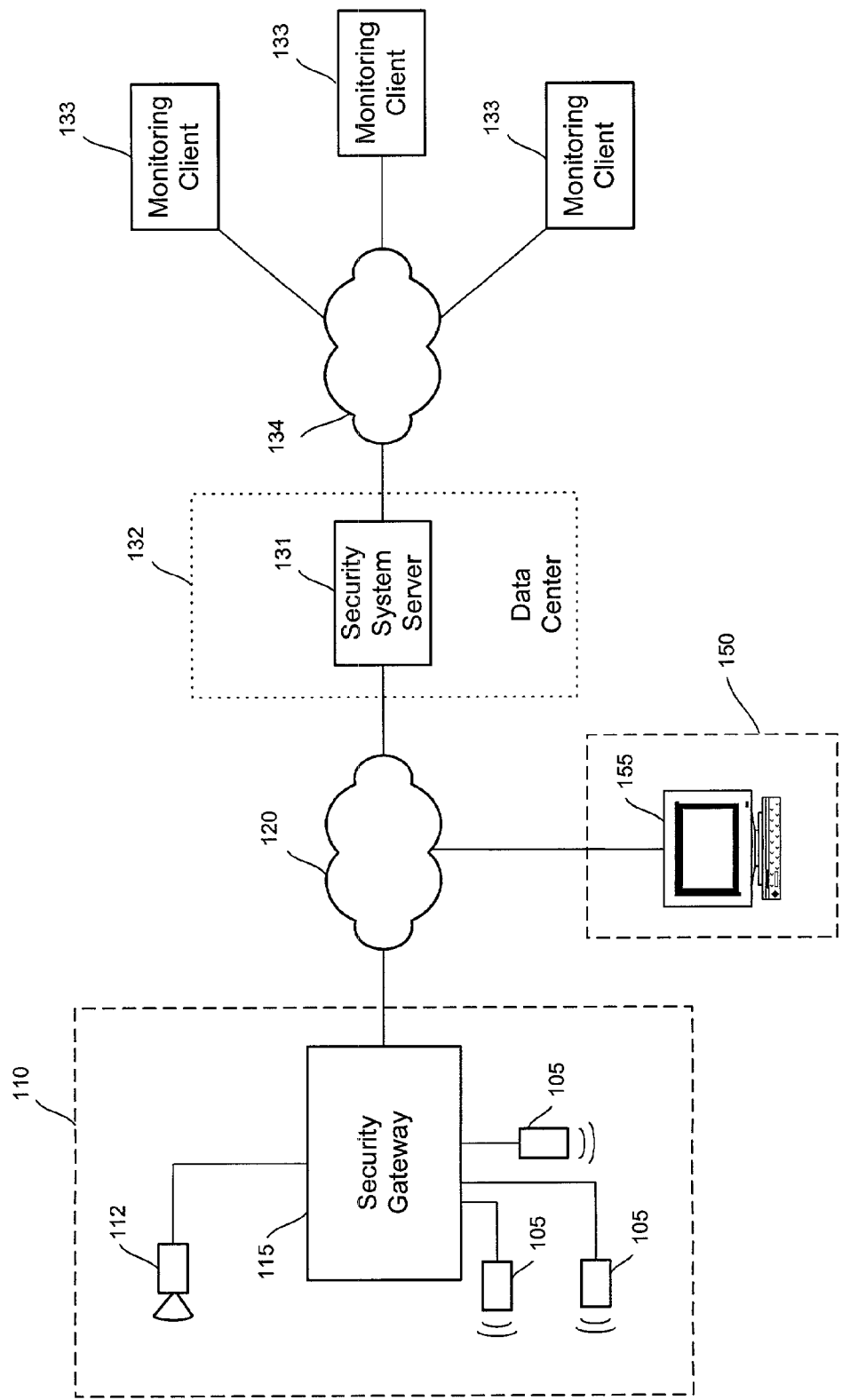
FIG. 2 is a more detailed block diagram of a security system according to one embodiment of the disclosed system and method.

FIG. 2 is a more detailed block diagram of a system according to one embodiment of the present invention. As shown, security gateway 115 is operatively coupled to data center 132 through network 120, which is, in turn, operatively coupled to a plurality of monitoring clients 133 through network 134.

Technology-intensive equipment including the security system server 131 may be kept in the data center 132 where physical access may be strictly controlled. Advantageously, in this configuration, non-technical personnel may be kept away from the sophisticated and expensive equipment in the data center 132, and the non-security-related personnel would not have direct access to view sensitive alarm notifications and videos.

Any alarm notification and video information sent by security gateway 115 is transmitted to the security system server 131 at the data center 132. The security system server 131 logs the alarm notification and retrieves information about the customer, which may include, without limitation, any prior alarm notifications or events. The security system server 131 also transmits the alarm notification and video information, along with any additional information, to one or more of the monitoring clients 133, where such information and video may be displayed for a monitoring operator to determine if an alarm condition exists. Preferably, such operators are trained to review alarm video on monitoring client 133 and determine whether an alarm condition exists. Because of the sensitive nature of the job, it may be desirable that access to monitoring clients 133 be restricted, and operators be subjected to drug testing and reference and background checks. In addition, in some states, security system employees must be registered for security monitoring, which may require submission of fingerprints as well as a criminal background check against both Department of Public Safety and FBI records. With respect to training, it may be desirable for monitoring personnel to attend Securities Industry Association (SIA) training, which includes basic alarm system training as well as training on the security system server 131 and the telephone system.

Monitoring client 133 notifies monitoring personnel of alarm conditions and manages responses to these events. In addition, monitoring operators may use monitoring client 133 to retrieve customer information, pass codes, and provide summaries of previous events. Monitoring operators may access audio and video data associated with the current alarm condition. Monitoring client 133 may also allow monitoring personnel to review audio and video content associated with closed (i.e. historical) alarm conditions.

As illustrated, the security system includes a plurality of distributed monitoring clients 133. In some embodiments, the monitoring clients are located at two or more discrete locations. In one particular embodiment, each of the monitoring clients is located at its own location apart from the other monitoring clients. However, in many embodiments, groups or clusters of monitoring clients are located at each respective location. For example, one cluster of monitoring clients 133 may be located at a first central monitoring station, while another cluster of monitoring clients 133 may be located at a second central monitoring station.

In the illustrative embodiment, communications between security gateway 115, data center 132, and monitoring clients 133 may occur through public and/or private networks. In particular, security gateway 115 is coupled to data center 132, which is coupled to monitoring clients 133 through network 134. Though network 134 is logically depicted as a single network, it is noted that network 134 may comprise a plurality of data networks that may or may not be homogeneous. In one embodiment, at least some of the monitoring clients 133 are coupled to the security system server 131 through the Internet. In other embodiments, the monitoring clients 133 are coupled to the security system server 131 through dedicated connections such as a frame relay connection or ATM connection. Advantageously, maintaining dedicated lines between headend 320 and data center 132 and between data center 132 and monitoring client 133 provides a secure connection from headend 320 to monitoring client 133 that may have dedicated bandwidth and/or low latency. Network 134 includes all such networks and connections. In another embodiment, not shown, data center 132 may be coupled to monitoring clients 133 through network 120.

When security system server 131 receives notification of an alarm, it determines which of the plurality of monitoring clients 133 to send the alarm notification, alarm video and alarm information. In some embodiments, security system server 131 may route an alarm notification, alarm video, and alarm information to one or more monitoring clients 133 using rules-based routing. With rules-based routing, the security system server 131 may designate that one or more of the monitoring clients 133 that meet a set of criteria handle a particular alarm condition This set of criteria may be predetermined or may be dynamically determined based upon the alarm event or circumstances surrounding the alarm event. For example, an alarm notification and related video may be delivered to one or more monitoring clients 133 that have the current availability to review them. Other criteria that may be used include, but are not limited to, geographical location of the monitoring client 133, proficiencies/skills of the monitoring client 133, and network efficiencies. Further, the routing criteria may specify a minimum resource requirement that must be met by a designated monitoring client. Such resource requirements may include, without limitation, a minimum hardware (e.g., processor, memory, video display) requirement, minimum network connection speed requirement, software requirement, and/or the capability to interact with the appropriate authorities (e.g., the police department, the emergency medical dispatch, or other public safety agency). Still further, in some embodiments, monitoring operators may possess one or more proficiencies which are noted by the respective monitoring client. In these embodiments, the routing criteria may include one or more proficiency requirements. Examples of proficiencies, include, without limitation, understanding foreign languages, handling specific types of alarms (e.g., burglar, fire, medical), and possessing a minimum level of experience.

When the operator of a designated monitoring client 133 receives the alarm notification and related information and begins to review the event, the monitoring client 133 notifies the security system server 131 that the alarm condition is being processed. In some embodiments, if, after a predetermined amount of time, the security system server 131 does not receive an indication that an alarm condition is being processed by any of the designated monitoring clients 133, the security system server 131 may resend the notification and information to the designated monitoring clients and/or send them to other available monitoring clients, for example, using a less restrictive set of routing criteria. Similarly, if the security system server 131 does not receive an indication whether an alarm condition corresponds to an actual alarm event within a predetermined amount of time, the security system server 131 may resend the notification and information to the designated monitoring clients and/or send them to other available monitoring clients.

In some embodiments, uninterruptible power supplies and/or backup generators may be used at the data center 132 to protect against power surges and blackouts. In addition, in some embodiments, the perimeter of the operations rooms at the data center 132 is fire resistant. Also, in some embodiments, data center 132 may be implemented in several locations. The "data center" would then refer to the aggregate of all of them with the block diagram showing the conceptual relationship. In addition, as described below in conjunction with FIG. 4, data center 132 may be implemented redundantly to guard against failure. Advantageously, the use of some or all of the preceding precautions helps to ensure that the system perform reliably even in the face of disaster conditions.

Figure 3:
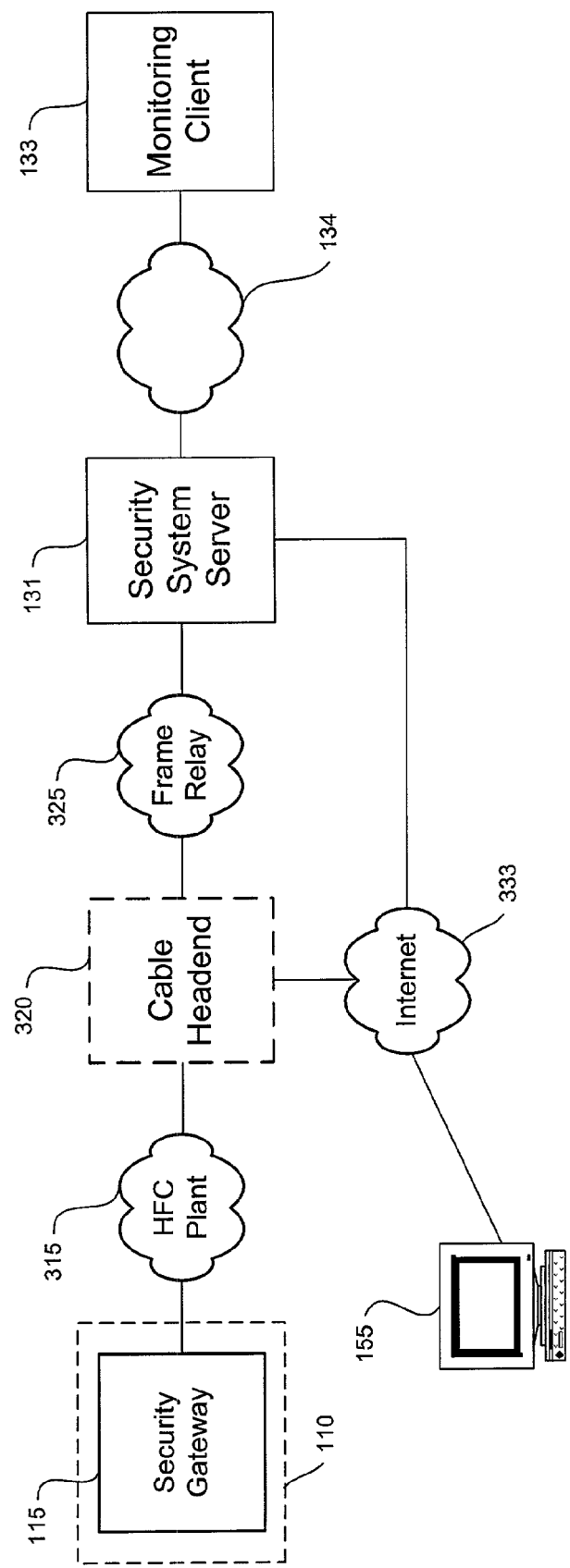
FIG. 3 is a simplified block diagram of a security system utilizing the cable infrastructure according to one embodiment of the disclosed system and method.

As shown in FIG. 3, some embodiments of the present invention contemplate the use of the cable television infrastructure (which may include, without limitation, HFC plant 315 and cable headend 320) and cable modem technology for the broadband transmission and receipt of information. As shown, security gateway 115 may be coupled through headend 320 to a security system server 131, which is further coupled to monitoring client 133. In a typical configuration, numerous security gateways 115 would be connected to a single headend 320. Similarly, several headends 320 may be coupled to each security system server 131.

Advantageously, the broadband connection provided by a cable modem connection provides the high throughput that is required for transferring large amounts of data, as is required when transmitting video. Accordingly, high-quality video may be transmitted from the security gateway 115 in substantially real-time to security system server 131, where it may be distributed to monitoring client 133. This allows personnel using monitoring client 133 to review the video while there is still time to take action. A further advantage is that the cable infrastructure is already in place for many homes and businesses, thereby reducing installation costs.

There are two main cable modem standards, the Multimedia Cable Network System (MCNS)'s Data Over Cable Service Interface Specification (DOCSIS), and the 802.14 from the Institute of Electronics and Electrical Engineering (IEEE), which are hereby incorporated by reference. The present invention contemplates the use of these and other cable modem standards.

In a typical large market cable network, a regional cable headend 320 (typically serving up to 200,000 to 400,000 homes) feeds distribution hubs (each serving up to 20,000 to 40,000 homes) through a metropolitan fiber ring. At the distribution hub, signals are modulated onto analog carriers and then transported over fiber-optic lines to nodes (not shown) serving up to 500 to 1,000 locations. From the node, these signals are carried via coaxial cable to a home or business.

Headend 320 receives television signals via satellite and local broadcast and converts them to signals that can be sent over coaxial cable to subscribers. To deliver digital data, headend 320 controller modulates the IP packets, encodes them as a digital signal, and broadcasts the signal down the cable on an unused channel. The cable modem demodulates the incoming signal and translates it back into IP packets the computer can understand. The cable modem also sends data upstream to the Internet through the cable system. At the user location, the television signal is received by a set-top box, while user data is separately received by a cable modem box.

Older cable networks used a large amount of coaxial cable (in a tree-and-branch topology) with the associated need for many amplifiers. Many modern networks, such as the one depicted, operate over a hybrid fiber/coax (HFC) plant 315, with increasingly high fiber content, coming within a few hundred meters of subscribers' locations. In particular, they may have fiber-optic backbones that terminate in fiber coaxial neighborhood node. The combination of deeper fiber penetration in the cable access network combined with modern digital modulation techniques has increased the bandwidth that can be delivered to cable customers. It is noted that other cable infrastructures may be used without departing from the scope of the invention.

Still referring to FIG. 3, headend 320 includes a connection to security system server 131 through network 325. In some embodiments, the connection between headend 320 and security system server 131 is a dedicated and/or guaranteed connection, such as through a frame relay network (as shown). An advantage to having such a connection is a level of service and/or bandwidth that may be difficult to obtain over public networks such as the Internet. Specifically, with existing TCP/IP network such as the Internet, a degree of latency and unpredictability are often unavoidable. However, in some embodiments, such latency and unpredictability may be acceptable.

In other embodiments, other broadband infrastructures such as DSL, fiber, and wireless may be used without departing from the scope of the invention. In such other embodiments, it may be desirable to have a dedicated or private connection to the security system server 131 from an aggregation point in the infrastructure (such as the cable headend in cable modem networks, and the DSLAM in DSL networks).

Embodiments of the present invention may incorporate redundancy for some or all of the components of the security system 100 to ensure that alarm conditions are responded to as quickly as possible, even in the event of partial system failure. Further, the systems described above are easily scalable to accommodate additional users. In contrast, with traditional security systems, security panels are set up to communicate with a specific monitoring center. This does not allow for the security system to scale efficiently or offer the reliability of embodiments of the present invention.

Figure 4:
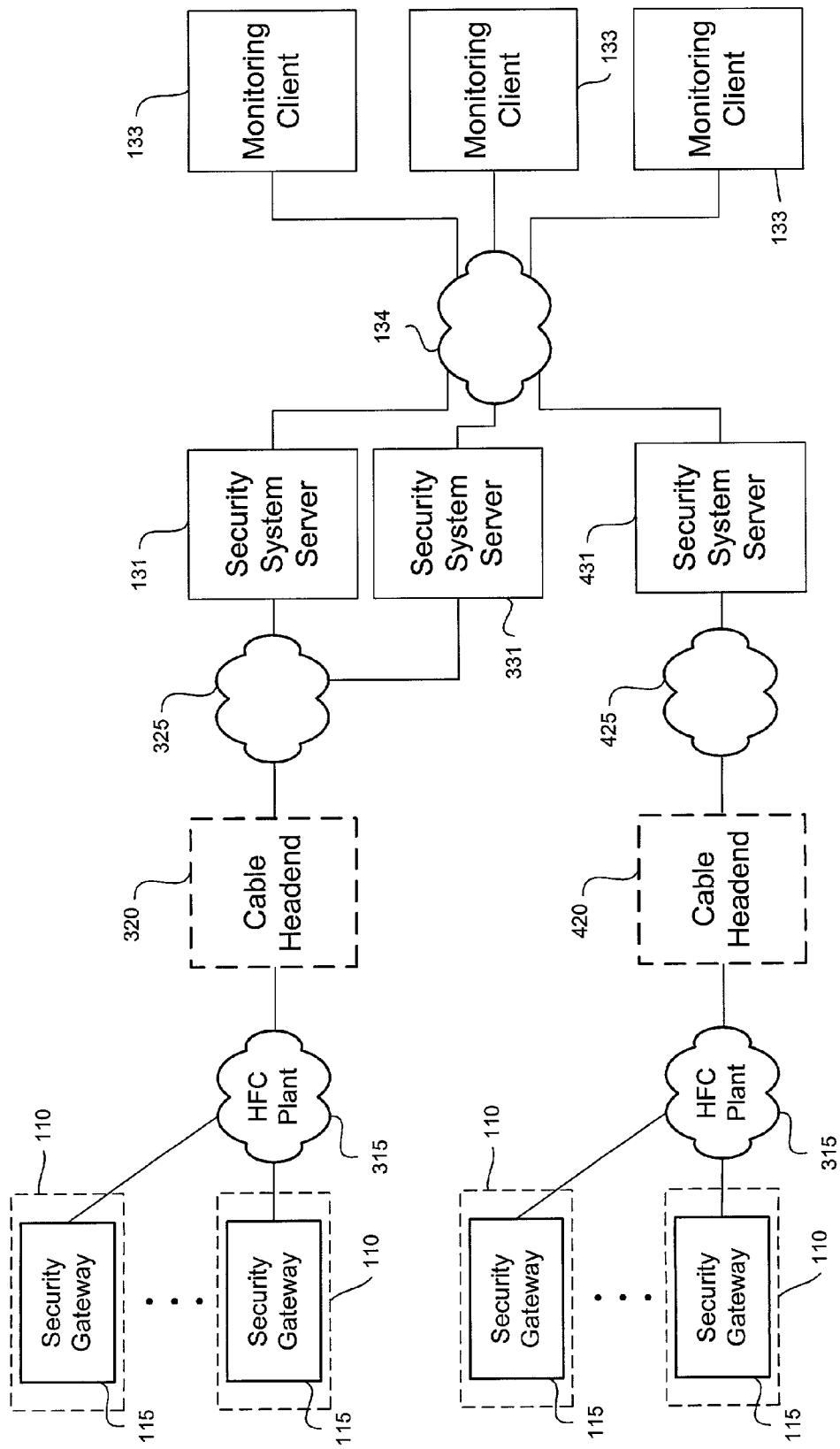
FIG. 4 is a block diagram of a security system featuring redundancy according to one embodiment of the disclosed system and method.

FIG. 4 depicts one such embodiment. It is understood by one of skill in the art that the present invention is not limited to the architecture depicted in FIG. 4. Any other existing or future redundancy or load-balancing technology may be used without departing from the scope of the present invention. With the present invention, monitoring clients may be easily added to the pool of available monitoring clients by simply registering with the present security system servers. In one particular embodiment, the monitoring client would provide during the registration: authentication information, its network address, its resource capabilities, and the proficiencies of its operator. In addition, as illustrated, all of the present security system servers may but are not required to utilize the same pool of monitoring clients. Advantageously, the system illustrated in FIG. 4 allows for the more efficient distribution of alarm notifications to any of monitoring clients 133 that may be located across the country, based on the availability of monitoring clients, skills of monitoring clients and/or network congestion.

Further, the systems architecture embodying the present invention allows capacity for supporting additional security gateways 115 to be added relatively easily. For example, one or more security system servers 331 may be added to provide additional capacity for an existing headend 320. In one embodiment, some of the existing security gateways 110 connected to cable headend 320 may be reprogrammed to send their alarm notifications and alarm video to security system server 331. New security gateways that are added to cable headend 320 may be assigned to either of the security system servers to balance their respective loads. It is further noted that the present invention contemplates the use of any other load-balancing techniques and technology.

Additional headends, such as cable headend 420, may be added to the monitoring system without the need to implement its own set of monitoring clients. As shown, security system server 431 may have access to the existing pool of monitoring clients 133. In some embodiments, security system server 431 may be configured to load share with other security system servers that may have capacity but may not be configured to support the same cable headend.

Figure 5:
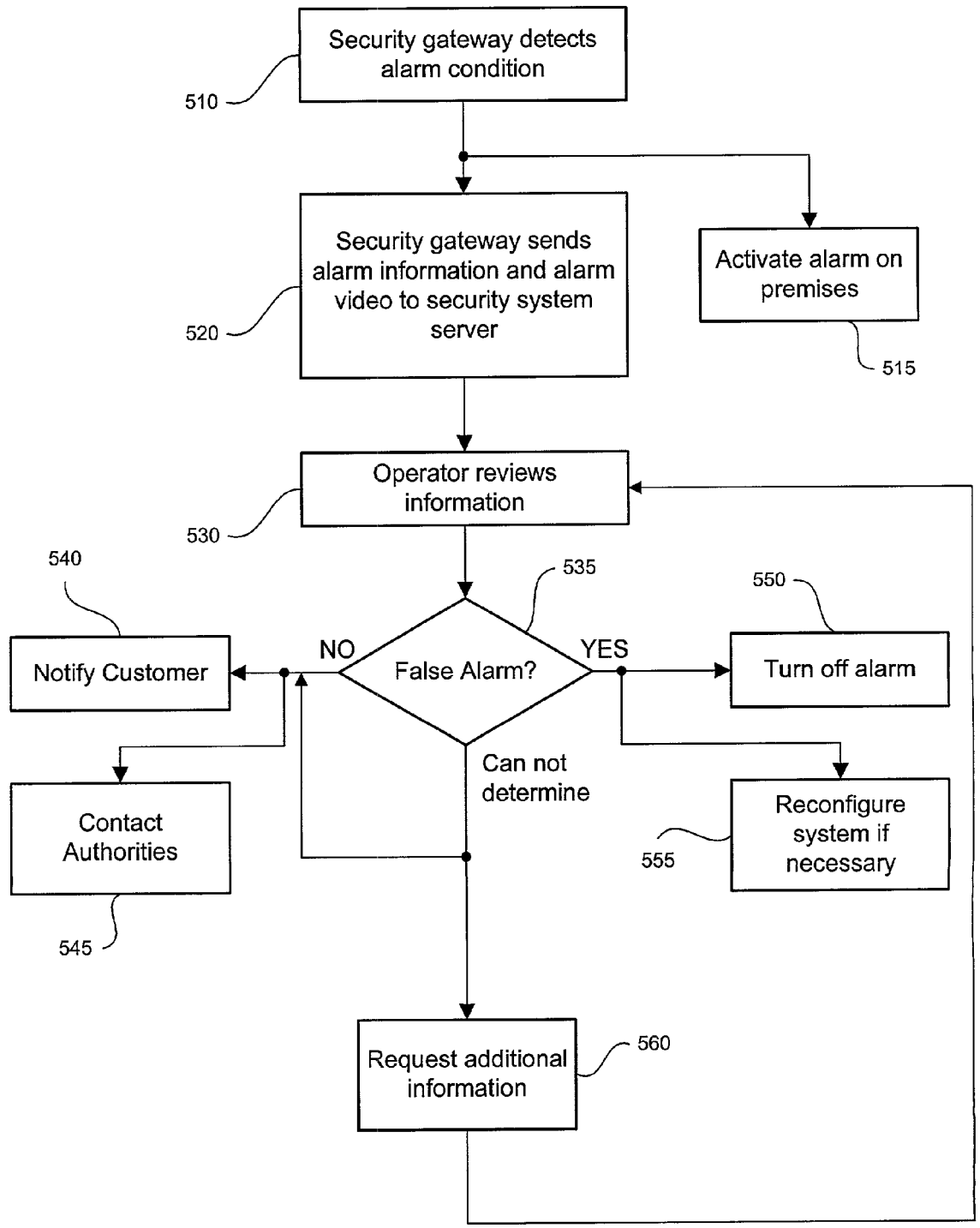
FIG. 5 is a flowchart of the operation of the security system according to one embodiment of the disclosed system and method.

Referring now to FIG. 5, a flowchart diagram is shown illustrating the operation of a security system as described above, according to one embodiment of the present invention.

In step 510 security gateway 115 detects an alarm condition corresponding to a possible alarm event. This may result from a triggered sensor, analysis of recorded video, the pressing of a panic button, or any combination thereof. Optionally, upon detection of an alarm condition, security gateway 115 may activate 515 a siren, ring a bell, and/or otherwise sound an audio alarm on the premises. Advantageously, this may scare away any intruder(s) while an operator at the central monitoring station verifies the alarm signal. As a further option, after security gateway 115 detects an alarm, either the security gateway 115 or security system server 131 may also transmit the alarm signal and alarm video corresponding to the alarm condition automatically to customer (whose home, business, or other location is being monitored) at an email address by any other electronic means.

In step 520, upon detection of an alarm event 510, alarm information may be sent from security gateway 115 to the security system server 131 and may include a notification of the alarm condition and information relating to the alarm condition, which may include alarm video. In the present disclosure, the term "alarm video" shall mean generally a segment of video corresponding in time to an alarm condition and may include audio. The alarm information may, but is not required to, contain information regarding the detected alarm event including, but not limited to, the type of sensor that detected it, and data from that sensor regarding the detected alarm condition. In addition, security gateway 115 may, at the same time, notify alarm receiver 740 at the central monitoring station 136 of the alarm condition through the secondary alarm channel (PSTN 145). Since this secondary notification channel is typically a low-bandwidth connection, alarm video is generally not sent. However, in some embodiments, audio and other additional lower-bandwidth-intensive data is sent through PSTN 145. In these embodiments, alarm receiver 740 alerts security system server 131 and one or more monitoring clients 133 of the alarm condition at premises 110.

The primary means of this notification is through network 120. However, as discussed above, a secondary alarm notification may be used. When the secondary PSTN alarm notification is used, the security gateway may be configured to seize the telephone line to report the alarm to a monitoring client 133. Typically, the secondary alarm network is of low-bandwidth. Accordingly, only the alarm notification is sent. However, in some embodiments, a higher bandwidth network may be used for the secondary alarm notification. In such cases, the alarm video may also be sent.

After receiving alarm notification 520, security system server 131 relays the notification to one or more monitoring clients 133, as discussed above. The security system server 131 may also be configured to automatically retrieve stored data regarding the premises 110, the customer, or both and provide it to the monitoring clients 133. Such information may include, without limitation, an alarm history, whether the customer is on vacation, and any other information that the system may be configured to store.

In step 530, monitoring client 133 notifies a monitoring operator of alarm conditions and managing responses to these events. Preferably, the alarm video is received and displayed by monitoring client 133 closely in time to the detection of the alarm condition such that if follow up action is necessary, it can take place in a timely manner. For example, if security gateway 115 detects an alarm condition corresponding to a possible fire, it is imperative monitoring personnel notify fire department as quickly as possible.

CMS operators can retrieve customer contact information, pass codes, and summaries of previous events. In addition, CMS operators can also access audio and video associated with the current alarm condition. Operators can access live audio and video from the home, and the operator can switch between available cameras and control the muting of individual microphones. In addition, in certain circumstances video from non-alarm conditions may also be viewed—for example, with an exterior camera 112, positioned at the front door of a residence. In some embodiments, due to privacy concerns, monitoring client 133 may be configured to only allow display audio and video content associated with an open alarm conditions. Once the alarm condition has been closed by an operator, that content may no longer be made available for viewing. Optionally, monitoring client 133 may be configured to provided to CMS monitoring personnel for viewing video and audio content associated with closed (i.e. historical) alarm conditions. However, it other embodiments, it may be desirable that CMS personnel be able to view certain non-alarm video to aid in verifying an alarm condition. For example, in one embodiment, during the time an alarm condition remains open, CMS personnel may view non-alarm video that is related to the alarm condition. In addition, controls can be implemented to address privacy concerns. An example includes, but is not limited to, only providing non-alarm video recorded during the time the security system is armed. It is noted that in some embodiments of the present invention, video is only recorded when the system is armed. However, the present invention is not limited as such.

In step 535, a monitoring person or monitoring personnel staffing the monitoring client 133 verifies whether the alarm signal corresponds to an actual alarm condition using the alarm signal information and the segment of real-time video. In some instances, the alarm video is indeterminate as to whether the alarm signal corresponds to a false alarm. Advantageously, various embodiments of the present invention address this problem. For example, monitoring client 133 may be configured to allow monitoring personnel to request additional video or information 560 from security gateway 115 and/or security system server 131. In addition, the monitoring client 133 may be configured to initiate two-way audio communication with the monitored location to allow the monitoring personnel to attempt to obtain more information. Alternatively, monitoring personnel may call the monitored location or the customer at a contact number to try to determine whether the alarm signal is false. In some embodiments, indeterminate alarm signals may be treated as authentic.

If the alarm signal is deemed to be false, the monitoring client 133 may inform security gateway 115 of this designation such that security gateway 115 can take any appropriate follow up action(s). For example, security gateway 115 may immediately turn off any siren, bell, or other audio alarm 550. Other examples include but are not limited to security gateway 115 resetting itself, logging the event, and/or adjusting its sensitivity settings to try to avoid future false alarms 555. Further, data center 132 may be configured to either manually and/or automatically adjust said sensitivity settings to potentially avoid future false alarms 555.

If the alarm signal is deemed not to be a false alarm, monitoring personnel may take the appropriate follow-up action. Typically, this includes notifying the customer 540 and contacting the appropriate authorities 545, which may be the police department, emergency medical dispatch, or any other public safety agency. Advantageously, such authorities may be inclined to respond more promptly and/or with a higher sense of urgency because the probability of the alarm being false is reduced.

In some embodiments, the security system of the present invention may integrate directly with the systems of various emergency response agencies. For example in one embodiment, upon verification of an alarm condition at the central monitoring station, an alarm notification and alarm video may be transmitted directly into a police dispatch system.

Figure 6:
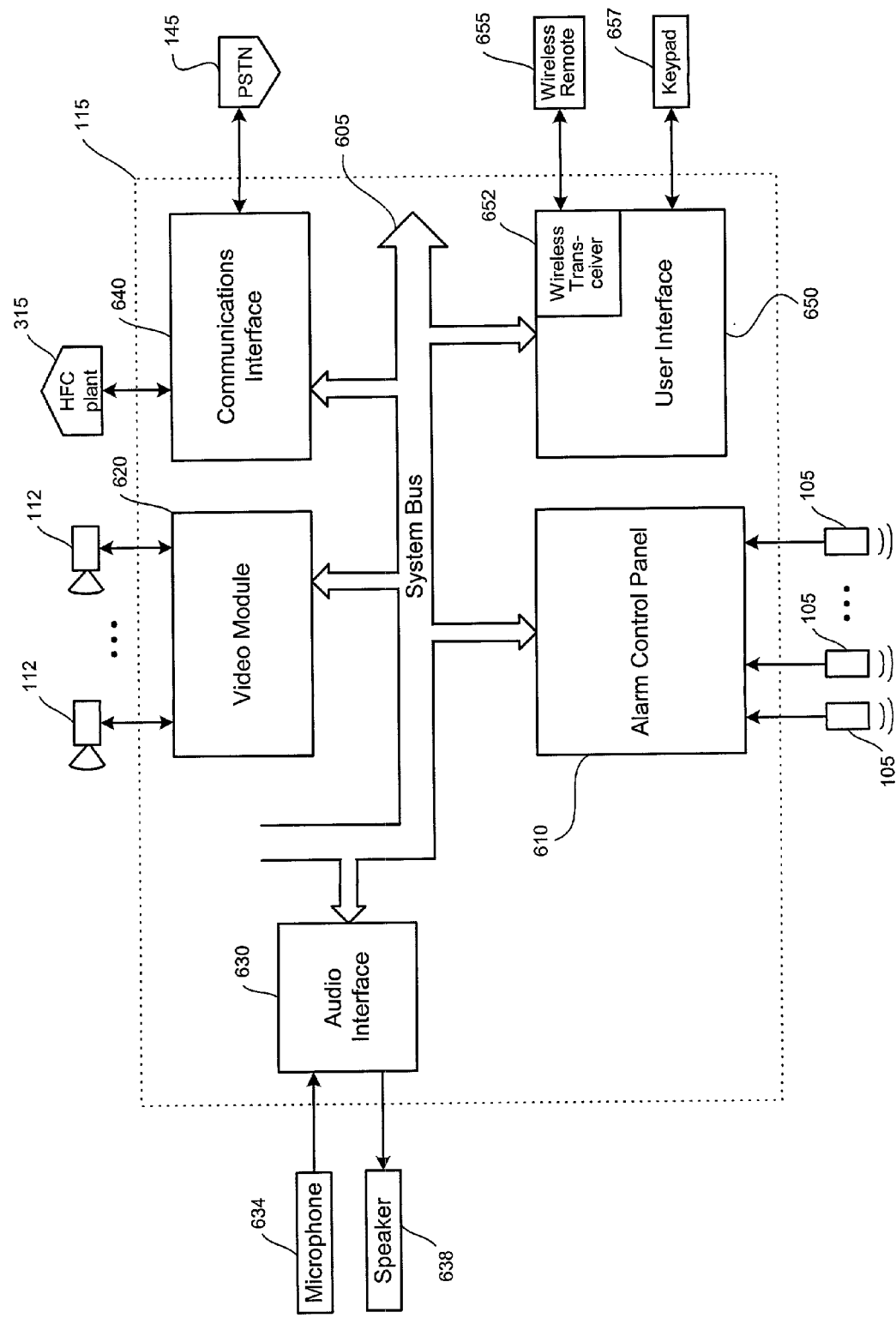
FIG. 6 is a more detailed block diagram of a security gateway according to one embodiment of the disclosed system and method.

FIG. 6 illustrates an exemplary embodiment of the security gateway. As shown, security gateway 115 may include alarm control panel 610, video module 620, user interface 650, communications interface 640, and audio interface 630. As shown, the components of security gateway 115 are configured to communicate with one another through system bus 605. In other embodiments, some or all of the components may be directly connected or otherwise operatively coupled to one another.

Alarm control panel 610 performs many of the same functions as traditional alarm control panel. For example, alarm control panel 610 interfaces with one or more sensors 105, which may be wired or wireless. In some embodiments, not shown, it may include an interface to the PSTN 145. However, as shown, the interface to the PSTN may be contained in the communications interface 640 instead of the alarm control panel 610. The alarm control panel 610 is preferably capable of operation in isolation as per UL requirements for residential fire applications and residential burglary operations. Alarm control panel 610 is further capable of continuing to operate in the traditional manner regardless of the state of the video subsystem. In an exemplary embodiment of the present invention, alarm control panel 610 is a COTS unit.

Further, alarm control panel 610 may be configured to communicate with the other components of the security system to monitor their operational state. Information that the alarm control panel 610 may receive includes, but is not limited to, whether security gateway 115 can communicate with the security system server through the communications interface 640, information about AC power failure, trouble by zone, fire trouble, telephone line trouble, low battery, bell output trouble, loss of internal clock, tamper by zone, fail to communicate, module fault, camera trouble, and intercom trouble. The detected operational failure of any component in security gateway 115 may be indicated by a communications loss between components and a concurrent alarm condition reported by alarm control panel 610 and displayed for the user on user interface 650 or announced through audio interface 630. In addition, any detected operation failures may be communicated to the security system server through communications interface 640. Alarm control panel 610 may also be configured to record alarm conditions and associated data in memory. The security system server may also be configured to record alarm conditions and associated data in addition to or in lieu of alarm control panel 610 doing so. In other embodiments, other components of security gateway 115 may be configured to perform this function. For example, in one embodiment, video module 620 records alarm conditions and the associated data.

Video module 620 may perform many functions including but not limited to analyzing data from alarm sensor 105 and/or video camera 112 to determine whether an alarm condition exists; accessing data stored in memory; generating alarm video to transmit to security system server 131 in response to detection of an alarm condition; and communicating with security system server 131 and remote user 155 through communications interface 640. In addition, video module 620 may buffer video from video cameras 112 in memory. Then, based on predefined criteria, older video that is not considered essential to any alarm signals may be discarded. Video module 620 may also be configured to record video, or portions thereof, on a predetermined basis, which may correspond, for example, to the requirements of the customer. Non-alarm video may be stored for later retrieval by the customer. In one embodiment, the customer or remote user 155 may able to adjust said predetermined basis including, without limitation, adjusting the recording times, duration, and total length of recordings. In some embodiments, non-alarm video may also be sent to the security system server for storage.

Video module 620 is also capable of streaming live audio and video from the residence during alarm conditions, as well as for lifestyle viewing over the World Wide Web. If a video camera 112 is analog, video module 620 may digitize the video before transmitting it. While streaming live media for lifestyle viewing, video module 620 causes alarm control panel 610 and/or speakers 638 to emit an audible tone on a periodic basis. This notification is to address privacy concerns. No firewall or intrusion software is running on video module 620. Video module 620 accepts network traffic on a limited number of ports (443, 2804, 7070). Typically the IP address of security gateway 115 may be assigned via DHCP.

Video module 620 may include a PC motherboard, a four-gigabyte hard disk drive, and a digital signal processor. The operating system for video module 620 is embedded Windows NT™. Video entering into video module 620 from security cameras 112 is in either CVBS, NTSC, or PAL format. Video compression may be based on the H.263 format. The audio compression standard for video module 620 may be ADPCM (16 Kbps). When security system 100 is armed, audio and video data are constantly being stored in the video module's memory for potential use as pre-event media. In one particular embodiment, video module 620 contains enough memory to store sixty seconds of pre-alarm video and audio from each camera 112 and microphone 634 in RAM and up to five minutes of audio/video content (per camera 112) on disk. When an alarm condition occurs, this cached data may be stored more permanently.

In one embodiment, system 100 may include one or more "smart cameras" that have much of the functionality of the Video Module built in. Specifically, these smart cameras may be operable to perform video capture, compression and storage and to communicate with the security gateway using a home area network, e.g., wireless or power-line. In essence, the smart camera would function as a network appliance that is able to receive instructions from the security gateway to control the session, FPS, quality, bandwidth, support other supervised communication from the gateway, and to transmit video and other information to the security gateway. In one specific embodiment, the smart camera compresses the video using the H.263 standard or better. Preferably, transmission between the camera and security gateway should be secure and reliable, even taking into account the relatively noisy household environment. Optionally, the smart camera is operable to detect motion in the recorded image and send an alarm signal to the security gateway.

Audio interface 630 performs a similar function to video module 620 but with respect to the audio components. In this embodiment, audio interface 630 includes an audio transmitter, such as a speaker 638, and an audio receiver, such as a microphone 634. In a typical configuration, several microphones and speakers would be located throughout the monitored premises. The audio signals picked up by microphone(s) 634 are recorded through audio interface 630. Audio interface 630 may record the audio or it may transmit the audio to video module 620 for storage. Audio interface 630 may be capable of selecting an individual audio input 634 or any combination of audio inputs 634. Further, audio interface may play back audio signals through speaker(s) 638. In some embodiments of the present invention, a two-way streaming audio stream may be initiated between a remote user (such as a remote client or monitoring station personnel) and the premises through audio interface 630. In one embodiment, the H.323 standard is used for such two-way streaming audio stream. Advantageously, the two-way audio stream allows the remote user to interact with the premises.

Communications interface 640 may serve as the gateway between security gateway 115 and one or more communications networks such as the HFC plant 315, PSTN 145, WAN, LAN, and wireless networks. Communications interface 640 may comprise software and hardware including, but not limited to a cable modem, an xDSL modem, and/or a network interface card. In some embodiments, communications interface 640 may be physically separate from the other components of security gateway 115. Regardless of its form, communications interface 640 assists in the communication of data to and security gateway 115 and security system server 131.

In one particular embodiment, upon detection of an alarm event, the alarm control panel 610 subsystem may initiate a dial-up connection and transmit the alarm to a receiver in security system server 131. More particularly, alarm control panel 610 may seize the telephone line in order to report the alarm to monitoring client 133. Alternatively, such functionality may be performed by communications interface 640. For delivering an alarm notification via the network, the video subsystem 620 may initiate a network connection and transmits the alarm to a receiver in security system server 131. Compressed audio and video data may also be transmitted. To conserve bandwidth, compressed audio streams typically do not exceed 16 kbps, since audio is "toll quality" so that both parties may easily understand each other. Preferably, the video and audio is playable with less than a 1-second shift in synchronization.

In addition, security gateway 115 may include user interface 650 that can activate or deactivate security system 100. In the illustrative embodiment, user interface 650 is operatively coupled to keypad 657. The user could thereby activate or deactivate system 110 by entering a predetermined code on keypad 657. It will be understood with the benefit of this disclosure of those of skill in the art that any other type of user interface 650 may be used with this invention. For example, security gateway 115 may be activated or deactivated with a remote portable transmitter 655. Wireless remote 655 communicates with user interface 650 via wireless transceiver 652. Additional receivers may be used with the present invention to pick up weak signals. Security gateway 115 is further capable of responding to up to 16 wireless f-button key fobs for changing partition states of security system 100. The key fobs do not use any of the 32 wireless zones, and each key fob is identified to security gateway 115 as a unique user.

User interface 650 may further include a display for displaying information to the user. Such information may include, without limitation, the current system status, whether an alarm condition has been detected, and whether any components have failed. In addition, other non-system-related information such as the time, date, weather forecasts, and news bulletins may be displayed.

In some embodiments, alarm control panel 610 supports dialup access by authorized users to remotely configure the system. However, the preferred mode of configuration is through a web site discussed below with respect to FIG. 7.

Figure 7:
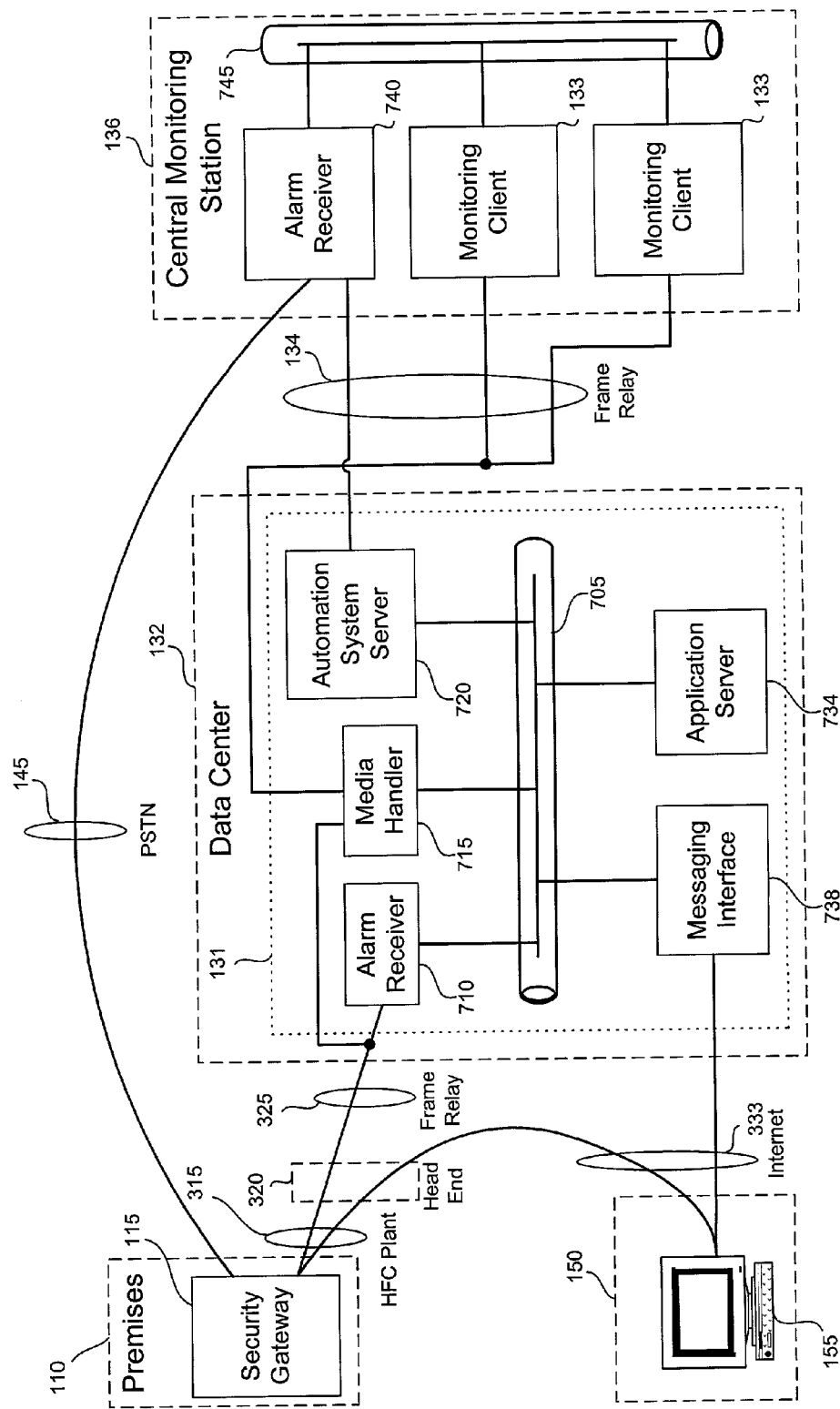
FIG. 7 is a more detailed block diagram of a security system according to one embodiment of the disclosed system and method.

FIG. 7 is a more detailed illustration of the various components of the security system server and monitoring station, according to one embodiment of the present invention. These components may be software programs executable on processor-based devices operable to communicate with one another through LAN 705 and LAN 745, respectively. In one particular embodiment, these components are processor-based devices operating under the Microsoft Windows NT™ operating system. However, it is understood that the present invention is not limited to the illustrated configuration. For example, the components may be implemented as software running on one or more computing devices. Alternatively, the components may be implemented in several devices that may be directly connected via communications interfaces (e.g., serial, parallel, IEEE 1394, IR, RF or USB).

As shown, security system server 131 may comprise alarm receiver 710, media handler 715, automation system server 720, application server 734 and messaging interface 738.

Alarm receiver 710 receives the alarm notification and associated information from security gateway 115. The alarm event is then logged and recorded by automation system server 720.

Alarm events reported by security gateway 115 via the PSTN are also sent to legacy alarm receiver 740. Legacy alarm receiver 740 posts the alarm condition to automation system server 720. Monitoring client 133 retrieves audio and video data from media handler 710. In one particular embodiment, the monitoring client 133 retrieves the audio and video data from media handler 710 using Microsoft's ActiveX component. In other embodiments, other media handling/communications protocols may be used, including, without limitation, custom protocols. The communications protocol is used to transmit audio and video content from media handler 710, submit control messages (for selecting cameras, microphones, and speakers during live feeds), and support Voice Over IP (VOIP) services between the residence and monitoring client 133 during an alarm condition.

Automation system server 720 is generally configured to store customer data, for example contact information, billing information, passwords, as well as alarm history. Alternatively, some or all of this information be stored in monitoring client 133 or at another remote site. Since this data is usually low bandwidth, dedicated bandwidth may not be necessary. However, it may be desirable for security purposes for it to remain in data center 132. Automation system server 720 may also serve as a workflow system for operators responding to alarm conditions, as well as a log of all monitoring activity. In an exemplary embodiment, automation system server 720 is a database application based on, for example Microsoft SQL Server 7,running under Windows NT. In another embodiment, automation system server 720 may be Monitoring Automation Systems' MAStermind™ server. CMS personnel may interface with automation system server 720 over the network via a client application, which may be built into monitoring client 133.

Media handler 710 is generally operable to provide several functions. For example, media handler 710 receives and stores video and audio data associated with alarm conditions from security gateway 115 and relays alarm condition data, for example audio and video, to monitoring client 133. Media handler 710 may also be responsible for keeping track of the network addresses for all the security gateways 115 that are attached. For example, media handler 710 relays alarm conditions reported via TCP/IP from security gateway 115 to automation system server 720. Media handler 710 may also provide access to audio and video associated with alarm conditions to authorized personnel for a predetermined time period after an alarm condition is detected. Additionally, media handler 710 may relay control and configuration data destined for security gateways 115. This data may originate either from a CMS operator through monitoring client 133 or from a remote client 155. The communications protocol between monitoring client 133 and media handler 710 may be proprietary and/or may use standard protocols.

In most embodiments, the communication channel 134 between the data center and central monitoring station is secure, and accordingly, an unencrypted protocol may be used. In one particular embodiment, an unencrypted ASCII protocol over a TCP/IP connection may be used. In configurations where the connection between the security system server and monitoring client(s) is not secure, it may be desirable to use an encrypted protocol.

The connection between headend 320 and media handler 710 is preferably a secure communications link. Communication between security gateway 115 and media handler 710 may be conducted over the cable modem infrastructure using, for example, the TCP/IP or UDP protocol. The communications protocol between security gateway 115 and media handler 710 may provide secondary pathways for transmitting alarm notifications, relays configuration information to security gateway 115 (including control messages for arming and disarming partitions, bypassing zones, and selecting cameras, microphones, and speakers for live feeds), uploading pre-event and relevant non-alarm audio and video to media handler 710 during an alarm condition, transmitting live video and audio during an alarm condition, supporting voice over IP (VOIP) services between the residence and monitoring client 133 during an alarm condition, and performing software updates.

In the illustrative embodiment, upon detection of an alarm condition, security gateway 115 transmits an alarm signal and video corresponding to the alarm condition (this video may be referred to as "alarm video") through headend 320 to media handler 710, which relays the information to the central station in substantially "real-time." In addition, alarm control panel 610 reports the alarm condition to the security gateway's video module 620, which uses a network connection to report the alarm condition to media handler 710, which in turn relays the information to automation system server 720. In the present disclosure, the term "real-time" transmission is intended to generally mean that no substantive time period events between the captured event and the receipt of alarm video corresponding to the event by monitoring client 133. In an exemplary embodiment, automation system server 720 will, then, receive two notifications of every alarm condition. Automation system server 720 is capable of recognizing multiple notifications of the same alarm condition, and may ignore all but the first notification. Automation system server 720 transmits the alarm condition data and notification to monitoring client 133. Monitoring client 133 may use the transmitted alarm video to aid in the determination of whether the alarm signal is a false alarm or not. Advantageously, the real-time transmission permits central monitoring station 136 to respond to an alarm signal in a timely manner. Timely response may increase the chance of apprehending an intruder, and in the case of life-threatening circumstances, reduce the likelihood of injury or death. Upon verification of the alarm signal, an operator at security system server 131 may take any appropriate action including, but not limited to, contacting the proper authorities, and/or directing security gateway 115 to sound an alarm.

Messaging interface 738 provides remote clients 155 with the ability to view and edit account information, arm and disarm their security system 100, and view live and recorded media from their home, all through a network-based interface. In many embodiments, this network-based interface is an Internet website, or a portion of a website. After the remote user is authenticated, application server 734 provides and/or facilitates the features available to remote client 155 through messaging interface 738. The particular features that are made available are a design decision that may vary based upon several factors, which may include, without limitation, the permissions of the remote user and the type of premises that is monitored. In one specific embodiment, application server 734 may run Dynamo under the Solaris operating system.

In one particular embodiment, a three-tier architecture may be used to provide such an interface. The first tier may consist of web servers running Internet Information Server (IIS) on Windows NT™, which is responsible for static web content such as images. Requests for dynamic content may be forwarded to application server 734. Application server 734 generally provides or facilitates all of the functionality that is accessible to remote clients 155. The third tier is a database tier, that may be provided by automation system server 720. Data storage may be, for example, a billing database. Authorized users may receive information from the database regarding their account by accessing database server 736.

Application server 734 may access automation system server 720 to obtain account information and issue commands ultimately destined for security gateway 115. Communication between application server 734 and automation system server 720 may take the form of calls to stored procedures defined in the master database maintained by automation system server 720.

In one particular embodiment, remote client 155 includes a web-browser-based video client for accessing audio and video data. Typically, the web-browser-based video client is a web browser or a plug-in for a web browser. However, in some embodiments (not shown), a custom software program may be used to interface with messaging interface 738. Access to messaging interface 738 requires successful authentication in the form of a username and password. Preferably, all account-specific web content, including the login request, employs the secure HTTP protocol. In one embodiment, each customer may be assigned a General_Administrator (GA) account. GA accounts have full access to their respective associated security gateway 115. The GA account can also create a limited number of guest accounts that have limited access to their respective associated security gateway 115. Typically, all account information is stored through automation system server 720, including surnames and passwords. Messaging interface 738 retrieves account data from automation system server 720 for display via the Web, by means of one or more stored procedures. The GA can modify a subset of this account data and update the corresponding entries in automation system server 720.

After the remote client 155 is authenticated, application server 734 may be configured to allow a remote client 155 to view audio/visual content from security gateway 115, communicate with automation system server 720 to access customer data, and access features of the security system 100. In one embodiment, such features may include, without limitation, arming or disarming security system 100; adjusting sensitivities of sensors 105 (if present); adjusting alarm condition detection sensitivity; remote surveillance; adjusting camera 112 settings; and reviewing alarms and recordings.

In particular, application server 734 may allow remote client 155 to access media directly from security gateway 115, as discussed below with respect to FIG. 8. In one embodiment, a live feed from the residence is available with the ability to select among cameras 112 and microphones 634. In some embodiments, only video from certain specified cameras is accessible for remote clients. In addition, for privacy purposes, it may desirable to provide an audible or visual indication that a remote user is receiving a video/audio feed. In some embodiments, application server 734 may be configured to allow a remote client 155 to initiate a two-way streaming audio connection with the security gateway 115 so that the remote client 155 can communicate through the speaker(s) and microphone(s) attached to security gateway 115.

Security gateway 115 may be configured to limit the transmission of all data (heartbeat, control, video, and audio) to a configurable ceiling relating to the remote client 155 access. Advantageously, this may provide the necessary amount of bandwidth to deliver the requested services, but prevents one user from creating a network bottleneck by requesting too much data at once. In one embodiment, a 128 kbps transmission ceiling is imposed. Access by web based video client 157 to security gateway 115 may be preempted whenever an alarm condition occurs so that CMS personnel have full control over cameras 112 and microphones 634 to respond to the alarm condition.

Figure 8:
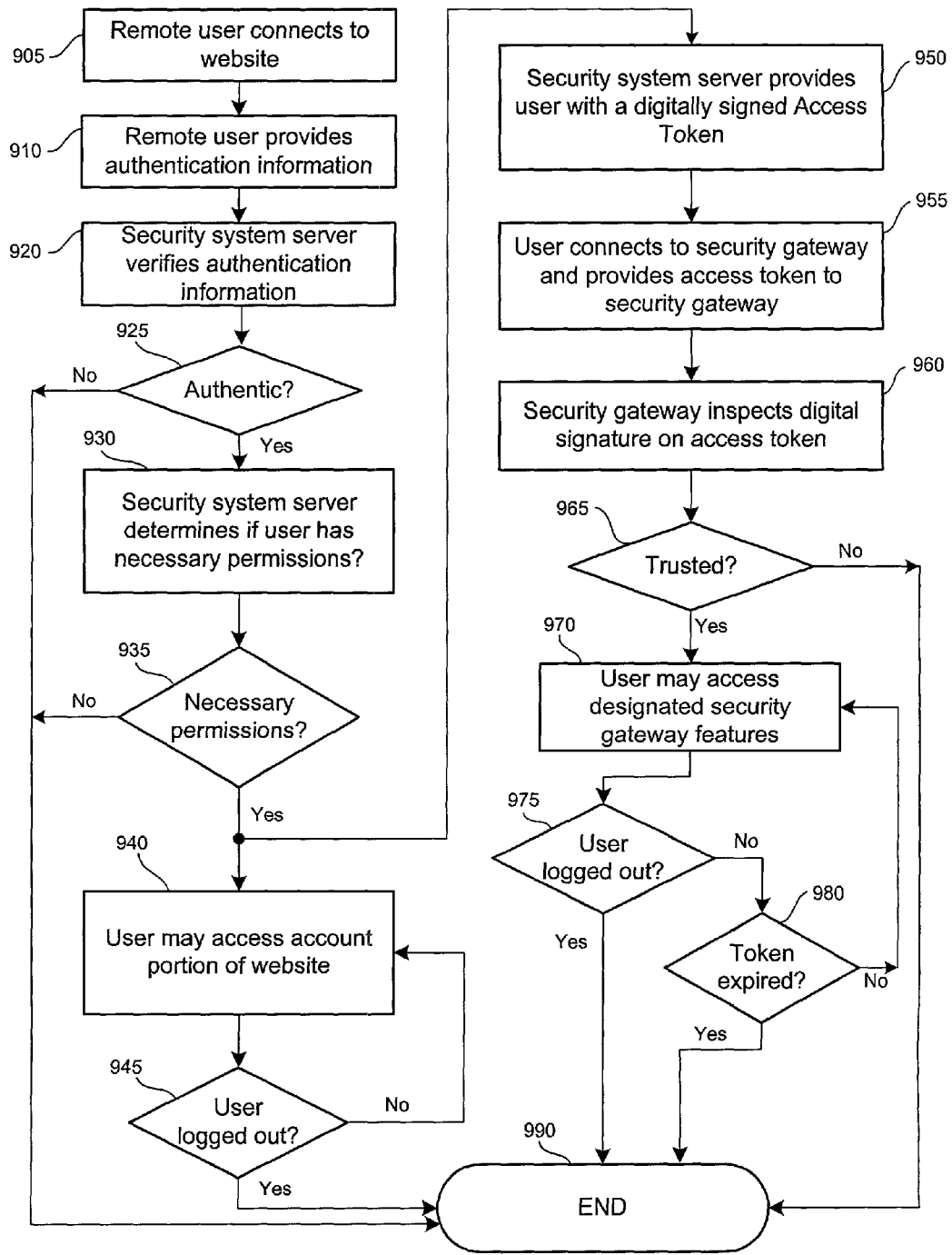
FIG. 8 is a flowchart of depicting the operation of a remote terminal accessing a security system according to one embodiment of the disclosed system and method.

Referring now to FIG. 8 a flowchart diagram is shown illustrating operation of the present invention authenticating and allowing remote access to features of security system. In particular, through an associated website (provided through messaging interface 738 and application server 734), remote users may access such features as viewing and editing account information, arming and disarming their security system 100, and viewing live and recorded media from the premises. The web browser/website interface transmits customer account and authorization information.

In step 905, remote terminal 155 may connect to the website. In an exemplary embodiment, remote terminal 155 may connect using an Internet World Wide Web browser such as Netscape's NAVIGATOR or Microsoft's INTERNET EXPLORER.

In step 910, remote user 155 provides the website with identification information, for example a username and password. The type of authentication used in remote authorization may take many forms. For example, in one embodiment the media handler may require some sort of a username and password combination. Further, it is to be understood by the disclosure of one of skill in the art that any other procedure suitable for authenticating the identity of remote terminal may be used.

The website interfaces with automation system server 720 to verify the identification information in step 920. If the information is determined to not be authentic in step 925, then remote user 155 is denied access. In one outcome of step 925, remote user 155 is denied access to security gateway 115 and its features. Precautions against unauthorized access may be implemented, including, but not limited to, logging incidents of denied access.

If the information is correct, the security system server 115 determines at step 930 if the user has the necessary permissions. Proceeding to step 935, if it is determined that the user has the necessary permissions, the user may access the account portion of the website at step 940. There, the user may change system settings such as username and password, review alarm history, and/or access any other features made available through the application server 734. It is noted that each user will only be able to access those features commensurate with the permissions associated with the account. Once the user logs out at step 945, he or she must reconnect to the website and reenter authentication information. Such features are provided through security system server 131.

In addition, in step 950, media handler 715 provides the remote client 155 with an access token that is digitally signed by the media handler 715. In one particular embodiment, application server 734 accesses media handler 715 to obtain an access token. In this embodiment, the user logs into messaging interface 738, which then allows the user to request the web page containing a plug-in. When this occurs, application server 734 queries automation system server 720 for security gateway 115 privileges associated with the user's account (for example, a guest account may be permitted to view only a subset of cameras 112 in the residence). Next, application server 734 submits a request to media handler 715 for an access token. This request encodes the username (for logging purposes), the identity of security gateway 115 to be accessed, the access permissions to be granted for the token, and the desired lifespan of the token, as well as the digital signature of the security system server 115. The response from media handler 715 contains the token (for example, a character string) as well as the current network address for security gateway 115. Application server 734 embeds the access token and security gateway 115 IIP address into the web page containing the plug-in and the resulting page is returned to the user's browser.

The remote client 155 may then connect directly to security gateway 115 and provides security gateway 115 with the access token 955. It is noted that the term "direct connection" means that communications between the remote client 155 and security gateway 115 do not pass through security system server 131. At step 960, the security gateway 115 inspects the token. The security gateway 115 is configured to trust valid digital signatures of the security system server 131. Accordingly, at step 965, the security gateway 115 determines if the token is trusted and, if so, the presence of the token in the web page allows the remote client 155 to access designated security gateway features at step 970. Thus, audio and video may be accessed from the customer's security gateway 115 without the need for all communication to be transmitted through data center 132.

Accordingly, the remote user may then connect directly to security gateway 115 to perform remote surveillance through security gateway 115, check the system status, initiate a two-way audio conference, and/or any other features made available by security gateway 115 and falling within the user's permissions. In some embodiments, only remote surveillance and two-way audio conferencing is made available through security gateway 115. In these embodiments, all non-media features are provided through security system server 131.

The remote surveillance feature allows remote user 155 to view all or portions of the video signal from video camera. Depending on the bandwidth of the connection, the video may be of a lower quality than that transmitted to central station for verification of alarm signals. For example, in one embodiment, the video transmitted to remote user 155 may have a lower frame rate, lower resolution, and/or lower color depth. In addition, remote user 155 may be able to configure the quality of the video for remote monitoring.

In addition, depending on the remote user's level of permissions, the remote terminal may access remote features of security gateway 115 directly through headend 320 to reconfigure security system 100. Once authenticated, remote user 155 may reconfigure some or all of the features of security gateway 115. These features may include, without limitation, arming or disarming security system 100; adjusting sensitivities of sensors (if present); adjusting alarm condition detection sensitivity; remote surveillance; adjusting camera settings; and reviewing alarms and recordings. Camera settings may include without limitation pan, tilt, focus, brightness, contrast and zoom.

When access to the designated security features is complete, the user logs out at step 975. In some embodiments, media handler 715 may assign a lifespan to an access token. In such cases, after a pre-specified time or event, the access token expires at step 980 and remote user 155 may not access security gateway 115 any longer. Further, when security system 100 detects that the user has logged out or disconnected from the security system 100, any access token provided by security system 100 expires.

In step 990, the remote client 155 is disconnected and the access token expires. In some embodiments, media handler 715 may assign a lifespan to an access token. In such cases, after a pre-specified time, the access token expires and remote user 155 may not access security system 100 any longer. To access the features of the security gateway 115, the user must reconnect to the website 905 and provide valid authentication information.

The present invention also overcomes similar problems with personal emergency response systems (PERS) and telemedicine including telehealth. The monitoring clients in these applications can now use the video and alarm to better diagnose the problem. In many ways, alarms from health sensors, emergency panic buttons and the like are similar to alarm sensors in terms of generating false and unwanted alarms.

The present invention can be also used in many different vertical segments within the security industry. In this present invention, the audio and video digitization and processing including compression is centralized at the security gateway. As processors become less expensive and more efficient, these functions can be done at the individual camera or at the audio station. The security gateway may then act as a central communications and controller for the cameras, audio stations and various other sensors.

The preceding examples are included to demonstrate embodiments of the invention. It should be appreciated by those of skill in the art that the techniques disclosed in the examples which follow represent techniques discovered by the inventor to function well in the practice of the invention, and thus can be considered to constitute preferred modes for its practice. However, those of skill in the art should, in light of the present disclosure, appreciate that many changes can be made in the specific embodiments which are disclosed and still obtain a like or similar result without departing from the spirit and scope of the invention.

What is claimed is:

1. A security system for providing security monitoring, comprising:
   a security gateway located at a designated premises, wherein the security gateway is operable to detect an alarm condition and to record video of at least a portion of the premises relating to the alarm condition, said video hereinafter referred to as the Alarm Video;
   a security system server operatively coupled to the security gateway, wherein the security gateway is configured to transfer to the security system server a notification of the alarm condition and the corresponding Alarm Video in substantially real time;
   a plurality of monitoring clients operatively coupled to the security system server;
   the security system server utilizing rules-based routing to select, based upon a predefined set of one or more rules, one or more of the plurality of monitoring clients, hereafter referred to as designated monitoring clients, to receive the notification of the alarm condition and the Alarm Video;
   wherein the security system server is configured to transfer the notification of the alarm condition and the Alarm Video to said designated monitoring clients; and
   wherein said designated monitoring clients are configured to display at least a portion of the Alarm Video and wherein said designated monitoring clients are configured to notify the security system server whether the notification of the alarm condition corresponds to an actual alarm condition.

2. The system of claim 1, wherein said set of rules comprises one or more minimum resource requirements that must be met by the designated monitoring clients.

3. The system of claim 2, wherein said one or more minimum resource requirements comprises an availability requirement.

4. The system of claim 1, wherein said set of rules comprises an availability requirement that must be met by the designated monitoring clients.

5. The system of claim 1, wherein at least one of the plurality of monitoring clients is operatively coupled to the security system server through the Internet.

6. The system of claim 1, wherein at least one of the plurality of monitoring clients is located at a location apart from the other of the plurality of monitoring clients.

7. The system of claim 1, wherein the security system server is further configured to transfer alarm information to the designated monitoring clients.

8. A security system for providing security monitoring, comprising:
   a security gateway located at a designated premises, wherein the security gateway is operable to detect an alarm condition and to record video of at least a portion of the premises relating to the alarm condition, said video hereinafter, referred to as the Alarm Video;
   a security system server operatively coupled to the security gateway, wherein the security gateway is configured to transfer, to the security system server, a notification of the alarm condition and the corresponding Alarm Video in substantially real time; and
   a plurality of monitoring clients operatively coupled to the security system server; wherein:
   the security system server is configured to transfer the notification of the alarm condition and the Alarm Video to one or more of the plurality of monitoring clients, referred to as designated monitoring clients, based upon a predefined set of one or more rules;
   said designated monitoring clients are configured to: (1) display at least a portion of the Alarm Video and (2) notify the security system server whether the notification of the alarm condition corresponds to an actual alarm condition; and
   said set of rules comprises a geography requirement that must be met by the designated monitoring clients.

9. A security system for providing security monitoring, comprising:
   a security gateway located at a designated premises, wherein the security gateway is operable to detect an alarm condition and to record video of at least a portion of the premises relating to the alarm condition, said video hereinafter referred to as the Alarm Video;
   a security system server operatively coupled to the security gateway, wherein the security gateway is configured to transfer, to the security system server, a notification of the alarm condition and the corresponding Alarm Video in substantially real time; and
   a plurality of monitoring clients operatively coupled to the security system server; wherein:
   the security system server is configured to transfer the notification of the alarm condition and the Alarm Video to one or more of the plurality of monitoring clients, referred to as designated monitoring clients, based upon a predefined set of one or more rules;
   said designated monitoring clients are configured to: (1) display at least a portion of the Alarm Video and (2) notify the security system server whether the notification of the alarm condition corresponds to an actual alarm condition;
   said set of rules comprises one or more minimum resource requirements that must be met by said designated monitoring clients; and
   said one or more minimum resource requirements comprises a network-efficiency requirement.

10. A security system for providing security monitoring, comprising:
    a security gateway located at a designated premises, wherein the security gateway is operable to detect an alarm condition and to record video of at least a portion of the premises relating to the alarm condition, said video hereinafter referred to as the Alarm Video;
    a security system server operatively coupled to the security gateway, wherein the security gateway is configured to transfer, to the security system server, a notification of the alarm condition and the corresponding Alarm Video in substantially real time; and
    a plurality of monitoring clients operatively coupled to the security system server; wherein:
    the security system server is configured to transfer the notification of the alarm condition and the Alarm Video to one or more of the plurality of monitoring clients, referred to as designated monitoring clients, based upon a predefined set of one or more rules;
    said designated monitoring clients are configured to: (1) display at least a portion of the Alarm Video and (2) notify the security system server whether the notification of the alarm condition corresponds to an actual alarm condition; and
    at least one of the plurality of monitoring clients is designated as having a proficiency, and wherein said set of rules comprises a proficiency requirement that must be met by the designated monitoring clients.

11. A method for providing monitoring in a security system comprising a security system server operatively coupled to a plurality of monitoring clients, wherein at least one of the plurality of monitoring clients is located at a location apart from the other of the plurality of monitoring clients, comprising:
    the security system server receiving notification of an alarm condition and video corresponding to the alarm condition, said video corresponding to the alarm condition hereinafter referred to as the Alarm Video;
    the security system server utilizing rules-based routing to select, based upon a predefined set of one or more rules, one or more of the plurality of monitoring clients, hereafter referred to as designated monitoring clients, to receive the notification of the alarm condition and the Alarm Video;
    the security system server routing the notification of the alarm condition and the Alarm Video to the designated monitoring clients;
    the designated monitoring clients displaying the notification of the alarm condition and the Alarm video;
    the respective operator at each of the designated monitoring clients determining whether the notification of the alarm condition corresponds to an actual alarm condition; and
    upon determining that the notification of the alarm condition corresponds to an actual alarm condition, the respective operator at each of the designated monitoring clients issuing a notification of the operator's determination.

12. The method of claim 11, wherein said set of rules comprises one or more minimum resource requirements that must be met by the designated monitoring clients.

13. The method of claim 12, wherein said one or more minimum resource requirements comprises an availability requirement.

14. The method of claim 11, wherein, upon determining that the notification of the alarm condition corresponds to an actual alarm condition, the respective operator at each of the designated monitoring clients selectively notifying: (a) a customer at whose premises said security system server is located; and/or (b) a public safety agency.

15. The method of claim 11, wherein upon determining that the notification of the alarm condition is indeterminate as to whether an actual alarm condition exists, the respective operator at each of said designated monitoring clients selectively: (a) requesting additional video from said security system server; and/or (b) initiating two-way communication with a customer at whose premises the notification of the alarm condition originated.

16. The method of claim 11, wherein upon determining that the notification of the alarm condition indicates that no alarm condition exists, the respective operator at each of said designated monitoring clients selectively: (a) resetting sensors that transmitted the notification of the alarm condition to the security system server; (b) adjusting sensitivity of the sensors that transmitted the notification of the alarm condition to the security system server; and/or (c) logging the false notification of the alarm condition.

17. A method for providing monitoring in a security system comprising a security system server operatively coupled to a plurality of monitoring clients, wherein at least one of the plurality of monitoring clients is located at a location apart from the other of the plurality of monitoring clients, comprising:
the security system server receiving notification of an alarm condition and video corresponding to the alarm condition, said video corresponding to the alarm condition hereinafter referred to as the Alarm Video;
the security system server routing the notification of the alarm condition and the Alarm Video to one or more monitoring clients, hereinafter referred to as designated monitoring clients, based upon a predefined set of rules;
the designated monitoring clients displaying the notification of the alarm condition and the Alarm video;
the respective operator at each of the designated monitoring clients determining whether the notification of the alarm condition corresponds to an actual alarm condition; and
upon determining that the notification of the alarm condition corresponds to an actual alarm condition, the respective operator at each of the designated monitoring clients issuing a notification of the operator's determination;
wherein said predefined set of rules comprises a geography requirement that must be met by the designated monitoring clients.

18. A method for providing monitoring in a security system comprising a security system server operatively coupled to a plurality of monitoring clients, wherein at least one of the plurality of monitoring clients is located at a location apart from the other of the plurality of monitoring clients, comprising:
the security system server receiving notification of an alarm condition and video corresponding to the alarm condition, said video corresponding to the alarm condition hereinafter referred to as the Alarm Video;
the security system server routing the notification of the alarm condition and the Alarm Video to one or more monitoring clients, hereinafter referred to as designated monitoring clients, based upon a predefined set of rules;
the designated monitoring clients displaying the notification of the alarm condition and the Alarm video;
the respective operator at each of the designated monitoring clients determining whether the notification of the alarm condition corresponds to an actual alarm condition; and
upon determining that the notification of the alarm condition corresponds to an actual alarm condition, the respective operator at each of the designated monitoring clients issuing a notification of the operator's determination;
wherein said set of rules comprises one or more minimum resource requirements that must be met by the designated monitoring clients and wherein said one or more minimum resource requirements comprises a network-efficiency requirement.

19. A method for providing monitoring in a security system comprising a security system server operatively coupled to a plurality of monitoring clients, wherein at least one of the plurality of monitoring clients is located at a location apart from the other of the plurality of monitoring clients, comprising:
the security system server receiving notification of an alarm condition and video corresponding to the alarm condition, said video corresponding to the alarm condition hereinafter referred to as the Alarm Video;
the security system server routing the notification of the alarm condition and the Alarm Video to one or more monitoring clients, hereinafter referred to as designated monitoring clients, based upon a predefined set of rules;
the designated monitoring clients displaying the notification of the alarm condition and the Alarm video;
the respective operator at each of the designated monitoring clients determining whether the notification of the alarm condition corresponds to an actual alarm condition; and
upon determining that the notification of the alarm condition corresponds to an actual alarm condition, the respective operator at each of the designated monitoring clients issuing a notification of the operator's determination;
wherein at least one of the plurality of monitoring clients is designated as having a proficiency, and wherein said set of rules comprises a proficiency requirement that must be met by the designated monitoring clients.

20. A method for providing monitoring in a security system comprising a security system server operatively coupled to a plurality of monitoring clients, wherein at least one of the plurality of monitoring clients is located at a location apart from the other of the plurality of monitoring clients, comprising:
the security system server receiving notification of an alarm condition and video corresponding to the alarm condition, said video corresponding to the alarm condition hereinafter referred to as the Alarm Video;
the security system server routing the notification of the alarm condition and the Alarm Video to one or more monitoring clients, hereinafter referred to as designated monitoring clients, based upon a predefined set of rules;
the designated monitoring clients displaying the notification of the alarm condition and the Alarm video;
the respective operator at each of the designated monitoring clients determining whether the notification of the alarm condition corresponds to an actual alarm condition; and
upon determining that the notification of the alarm condition corresponds to an actual alarm condition, the respective operator at each of the designated monitoring clients issuing a notification of the operator's determination;
wherein said set of rules comprises a network-efficiency requirement that must be met by the designated monitoring clients.

21. A security system for providing security monitoring, comprising:
- a plurality of security gateways, each located at a designated premises, wherein each security gateway is operable to detect an alarm condition and to record video of at least a portion of the respective premises relating to the alarm condition, said video hereinafter referred to as the Alarm Video;
- a plurality of security system servers, each security system server operatively coupled to at least some of the plurality of security gateways such that each of the plurality of the security gateways is operatively coupled to at least one of the plurality of security system servers, wherein each security gateway is configured to transfer to the one or more security system servers to which said security gateway is operably coupled, a notification of the alarm condition and the corresponding Alarm Video in substantially real time;
- a plurality of monitoring clients operatively coupled to the plurality of security system servers;
- each one of the plurality of security system servers utilizing rules-based routing to select, based upon a predefined set of one or more rules, one or more of the plurality of monitoring clients, hereafter referred to as corresponding designated monitoring clients, to receive the notification of the alarm condition and the Alarm Video;
- wherein each one of the plurality of security system servers are configured to transfer the received notification of the alarm condition and the Alarm Video to said corresponding designated monitoring clients; and
- wherein said corresponding designated monitoring clients are configured to display at least a portion of the Alarm Video, and wherein said corresponding designated monitoring clients are configured to notify the corresponding one of the plurality of security system servers whether the notification of the alarm condition corresponds to an actual alarm condition.

22. The system of claim 21, wherein at least one of the plurality of monitoring clients is operatively coupled to the security system server through the Internet.

23. The system of claim 21, wherein at least one of the plurality of monitoring clients is located at a location apart from the other of the plurality of monitoring clients.

* * * * *